United States Patent
Yang et al.

(10) Patent No.: US 8,559,740 B2
(45) Date of Patent: *Oct. 15, 2013

(54) METHOD, SYSTEM AND COMPUTER PROGRAM PRODUCT FOR PROVIDING ENTROPY CONSTRAINED COLOR SPLITTING FOR PALETTE IMAGES WITH COLOR-WISE SPLITTING

(75) Inventors: En-hui Yang, Petersburg (CA); Longji Wang, Waterloo (CA)

(73) Assignee: Slipstream Data Inc., Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,967

(22) Filed: Aug. 3, 2012

(65) Prior Publication Data

US 2012/0321183 A1    Dec. 20, 2012

Related U.S. Application Data

(63) Continuation of application No. 13/186,857, filed on Jul. 20, 2011, now Pat. No. 8,260,071, which is a continuation of application No. 11/534,956, filed on Sep. 25, 2006, now Pat. No. 8,000,547.

(60) Provisional application No. 60/719,585, filed on Sep. 23, 2005.

(51) Int. Cl.
    *G06K 9/46*      (2006.01)

(52) U.S. Cl.
    USPC ............................................... 382/240

(58) Field of Classification Search
    None
    See application file for complete search history.

(56) References Cited

U.S. PATENT DOCUMENTS

| | | |
|---|---|---|
| 5,047,842 A | 9/1991 | Bouman, Jr. et al. |
| 6,496,198 B1 | 12/2002 | Wang |
| 8,000,547 B2 | 8/2011 | Yang et al. |
| 2004/0170332 A1 | 9/2004 | Andrew |
| 2006/0188024 A1 | 8/2006 | Suzuki et al. |

OTHER PUBLICATIONS

Riskin, E.A.; Gray, R.M.; , "A greedy tree growing algorithm for the design of variable rate vector quantizers [image compression]," Signal Processing, IEEE Transactions on , vol. 39, No. 11, pp. 2500-2507, Nov 1991.*

Chou, P., Lookabaugh T., and Gray, R., "Entropy-Constrained Vector Quantization", IEEE Trans. Acous., Speech, and Signal Processing, vol. 37, No. 1, pp. 31-42, Jan. 1989.

(Continued)

*Primary Examiner* — Nirav G Patel

(74) *Attorney, Agent, or Firm* — Bereskin and Parr LLP/S.E.N.C.R.L., s.r.l.

(57) ABSTRACT

A method, system and computer program product for progressively encoding a digitized color image is provided. This involves: initializing a tree structure with at least one starting leaf node; determining at least one representative color for each starting leaf node; and growing the tree structure and updating an encoded image by repeatedly (i) selecting a leaf node n to become a non-leaf node n linked to two new leaf nodes based on an associated achievable cost; (ii) creating the two new leaf nodes by re-allocating each color in n; (iii) determining a representative color for each of the two new leaf nodes; and (iv) encoding the index information associated with the selected leaf node n, the representative colors of the two new leaf nodes, and information regarding a plurality of pixels of the digitized color image corresponding to the two representative colors of the two new leaf nodes.

52 Claims, 14 Drawing Sheets

(56) References Cited

OTHER PUBLICATIONS

Chou, P. and Lookabaugh T., "Conditional entropy constrained vector quantization of Linear Predictive Coefficients", IEEE, 1990, pp. 197-200.
Buzo, A., Gray Jr., A., Gray, R., and Markel, J., "Speech coding based upon vector quantization", IEEE Trans. Acous., Speech, and Signal Processing, vol. ASSP-28, No. 5, pp. 562-574, Oct. 1980.
Riskin, E. and Gray, R., "A greedy tree growing algorithm for the design of variable rate vector quantizers", IEEE Transactions on Signal Processing, vol. 39, No. 11, pp. 2055-2507, Nov. 1991.
Balakrishnan, M., Pearlman, W., and Lu, L., "Variable-rate tree-structured vector quantizers", IEEE Trans. Information Theory, vol. 41, No. 4, pp. 917-930, Jul. 1995.
European Search Report in relation to European Application No. 11181942, mailed May 7, 2012.
First Office Action in connection with CN Application No. 200680035129X, issued May 26, 2010.
Second Office Action in connection with CN Application No. 200680035129X, issued on Jan. 5, 2012.
Written Opinion of the International Searching Authority PCT/CA2006/001558, completed on Jan. 3, 2007.
International Preliminary Report on Patentability in relation to PCT/CA2006/001558, issued Mar. 26, 2008.
International Search Report in relation to PCT/CA2006/001558, mailed on Jan. 18, 2007.
International Search Report in relation to PCT/CA2006/001564, mailed on Jan. 2, 2007.
International Preliminary Report on Patentability for PCT/CA2006/001564, Mar. 26, 2008.
Examiner's report issued in connection with 11181942.1, dated Nov. 2, 2011.
Office Action issued in connection with U.S. Appl. No. 13/186857, datred Jan. 27, 2012, retrievable in Pair.
Office Action issued in connection with U.S. Appl. No. 11/534942, mailed on Oct. 1, 2009, retrievable in Pair.
Ligang Lu and William a. Pearlman, "Conditional Entropy-Constrained Tree-Structured Vector Quantization With Applications to Sources With Memory", pp. 1-34.
Ashdown, I., "Octree color quantization", C/C++Users Journal, vol. 13, No. 3, pp. 31-43, 1994.
Wu, X., "Yiq vector quantization in a new color palette architecture", IEEE Trans. on Image Processing, vol. 5, No. 2, pp. 321-329, 1996.
Velho, L., Gomes, J., and Sobreiro, M.V.R., "Color image quantization by pairwise clustering", Proc. Tenth Brazilian Symp. Comput. Graph. Image Process., L. H. de Figueiredo and M. L.Netto, Eds. Campos do Jordao, Spain, pp. 203-210, 1997.
Wan, S., Prisinkiewicz, P., and Wong, S., "Variance-based color image quantization for frame buffer display", Res. Appl., vol. 15, pp. 52-58, 1990.
Zaccarin, A., and Liu, B., "A novel approach for coding color quantized image", Image Processing, IEEE Transactions on, vol. 2, No. 4, pp. 442-453, Oct. 1993.
Memon, N.D., and Venkateswaran, A., "On ordering color maps for lossless predictive coding", IEEE Transactions on Image Processing, vol. 5, No. 11, pp. 1522-1527, 1996.
Huffman, D.A., "A method for the construction of minimum-redundancy codes", Proc. IRE, vol. 40, No. 9, pp. 1098-1101, 1952.
Ziv, J. and Lempel, A., "A universal algorithm for sequential data compression", IEEE Trans. On Information Theory, vol. 23, pp. 337-343, 1977.
Witten, I. H., Neal, M., and Cleary, J.G., "Arithmetic coding for data compression", Commun. ACM, vol. 30, pp. 520-540, Jun. 1987.
Yang, E.-H. and Kieffer, J.C., "Efficient universal lossless data compression algorithms based on a greedy sequential grammar transform—part one: Without context models", IEEE Trans. On Information Theory, vol. 46, No. 3, pp. 755-777, May 2000.
Kieffer, J.C. and Yang, E.-H., "Grammar based codes: A new class of universal lossless source codes", IEEE Trans. on Information Theory, vol. 46, No. 3, pp. 737-754, May 2000.

Office Action issued in connection with U.S. Appl. No. 11/534,956, mailed on Oct. 5, 2009, retrievable from PAIR.
De Garrido, D.P.; Lu, Ligang; Pearlman, W.A., "Conditional entropy-constrained vector quantization of displaced frame difference sub-band signals", Image Processing, 1994. Proceedings. ICIP-94., IEEE International Conference, vol. 1, pp. 745-749 vol. 1, 13-16, Nov. 1994.
Copy of Supplementary European Search Report for European Application No. 06790725.3.
Copy of Supplementary European Search Report for European Application No. 06790730.3.
Copy of Written Opinion of the International Searching Authority for PCT/CA2006/001564.
Copy of International Search Report for PCT/CA2006/001564.
First Examination report in relation to Indian Application No. 1077/CHENP/2008, dated Oct. 10, 2012.
Office Action in relation to co-pending U.S. Appl. No. 13/559,854, dated Nov. 13, 2012.
Second Office Action in Connection with CN Application No. 201110054316.5, dated Oct. 29, 2012.
Office Action, co-pending U.S. Appl. No. 13/559,854, dated Nov. 13, 2012.
First Examination Report in relation to Indian Application No. 1236/CHENP/2008, dated Jul. 31, 2012.
Third Office Action in Connection with CN Application No. 200680035129.X, dated Apr. 28, 2012.
Office Action, U.S. Appl. No. 13/023,135, dated Aug. 8, 2011.
Office Action, U.S. Appl. No. 13/023,135, Dec. 27, 2011.
Office Action, U.S. Appl. No. 13/186,857, filed Jan. 27, 2012.
Office Action, U.S. Appl. No. 11/534,942, dated Oct. 1, 2009.
Office Action, U.S. Appl. No. 11/534,942, dated May 5, 2010.
Examiner's Report in relation to 06790725.3, dated May 20, 2011.
Office Action in relation to Canadian Patent Application No. 2,620,885 issued Jan. 30, 2012.
Second Chinese Office Action in relation to 200680035093.5 issued Dec. 23, 2011.
First Chinese Office Action in relation to 201110054316.5 issued Mar. 1, 2012.
Examiner's Report in relation to 11181941.3 dated Jan. 18, 2012.
Office Action issued in connection with U.S. Appl. No. 13/186,857, datred Jan. 27, 2012.
Office Action issued in connection with U.S. Appl. No. 11/534,942, mailed on Oct. 1, 2009.
First Office Action in relation to Application No. 2006800350935 issued Mar. 11, 2010.
Office Action for related Canadian application 2,620,893 Feb. 13, 2012.
Ligang Lu and William A. Pearlman, "Conditional Entropy-Constrained Tree-Structured Vector Quantization With Applications to Sources With Memory", pp. 1-34, May 2000.
Barrilleaux, R.J., Hinkle, R., and Wells, S., "Efficient vector quantization for color image encoding", Acoustics, Speech, and Signal Processing, IEEE International Conference on ICASSP '87, vol. 12, pp. 740-743, Apr. 1987.
Yang, E.-H. and He, D.-K., "Efficient Universal Lossless Data Compression Algorithms Based on a Greedy Sequential Grammar Transform-Part Two: Within Context Models", IEEE Trans. on Information Theory, vol. 49, pp. 2874-2894, 2003.
Miano, J., "Compressed image file formats: Jpeg, png, gif, xbm, bmp", ACM Press, 2000.
Yang, E.-H. And Zhang, Z., "Variable rate trellis source encoding", IEEE Trans. on Information Theory, vol. 45, No. 2, pp. 586-608, Mar. 1999.
Yang, E.-H., Zang, Z. and Berger, T., "Fixed-slope universal lossy data compression", IEEE Trans. on Information Theory, vol. 43, No. 5, pp. 1465-1476, Sep. 1997.
Written Opinion issued in connection with corresponding PCT application PCT/CA2006/001564, mailed on Jan. 2, 2007.
Guillope V.: "Conditional Entropy-Constrained Vector Quantization of Chromatic Information in Document Images", retrieved from Internet: URL: http//www.site.uottawa.ca/school/research/viva/theses/Guillope_thesis.pdf; Jun. 2002.

(56) References Cited

OTHER PUBLICATIONS

Office Action issued in connection with U.S. Appl. No. 11/534,956, mailed on Oct. 5, 2009.

De Garrido, D.P.; Lu, Ligang; Pearlman, W.A., "Conditional entropy-constrained vector quantization of displaced frame difference sub-band signals", Image Processing, 1994. Proceedings. ICIP-94., IEEE International Conference, vol. 1, pp. 745-749 vol. 1, Nov. 13-16, 1994.

Supplementary European Search Report for European Application No. 06790725.3, Jun. 2, 2009.

Supplementary European Search Report for European Application No. 06790730.3, May 2, 2009.

Effros M. Ed—Storer J. A. et al., "Practical multi-resolution source coding: TSVQ revisited", Data Compression Conference, 1998, DCC '98, Mar. 30, 1998, pp. 53-62.

Gersho et al., "Vector Quantization and Signal Compression", Vector Quantization and Signal Compression, Boston, Kluwer, US, Jan. 1, 1991, pp. 352-355.

Chadda N. et al., "Color Quantization of Images Based on Human Vision Perception", Proceedings of the International Conference on Acoustics, Speech, and Signal Processing, vol. V, Apr. 19, 1994, pp. 89-92.

Wong, Ping Wah, "Entropy-Constrained Halftoning Using Multipath tree coding", IEEE Transaction on Image Processing vol. 6, No. 11, Nov. 1997.

Written Opinion of the International Searching Authority for PCT/CA2006/001564, Jan. 2, 2007.

International Search Report for PCT/CA2006/001564, Jan. 2, 2007.

Rauschenbach, U., "Compression of palettized images with progressive coding of the color information", in Proc. SPIE Visual Communications and Image Processing, Perth, Australia, Jun. 2000, vol. 4067.

Chen, X., Kwong, S., and Feng, J., "A new compression scheme for color-quantized images", IEEE Transactions on Circuits and System Video Technology, vol. 12, No. 10, pp. 904-908, Oct. 2002.

Orchard, M. and Bouman, C., "Color quantization of images", IEEE Transactions on Signal Processing, vol. 39, No. 12, pp. 2677-2690, Dec. 1991.

Linde, Y., Bozo, A. and Gray, R., "An algorithm for vector quantizer design", IEEE Trans. Communications, vol. COM-28, No. 1, pp. 84-95, Jan. 1980.

Document relating to IN Application No. 1236/CHENP/2008, dated Aug. 13, 2013 (Notice of Hearing).

* cited by examiner

METHOD, SYSTEM AND COMPUTER PROGRAM PRODUCT FOR PROVIDING ENTROPY CONSTRAINED COLOR SPLITTING FOR PALETTE IMAGES WITH COLOR-WISE SPLITTING

CROSS-REFERENCE TO RELATED APPLICATIONS

The present invention relates to progressive encoding of image data. The application is a continuation U.S. patent application Ser. No. 13/186,857, filed Jul. 20, 2011, which is a continuation of U.S. patent application Ser. No. 11/534,956, filed Sep. 25, 2006, which claims the benefit of U.S. Provisional Application Ser. No. 60/719,585, filed Sep. 23, 2005. The entire contents of U.S. patent application Ser. No. 13/186,857, U.S. patent application Ser. No. 11/534,956, and U.S. Provisional Application Ser. No. 60/719,585 are hereby incorporated by reference.

BACKGROUND OF THE INVENTION

Pictures with thousands or millions colors can be represented as true color images, storing the exact color for each pixel in the formats such as BMP (bitmap) and JPEG. In contrast, pictures containing only a few (typically up to 256) colors can be stored more efficiently as colormapped images or palettized images like the well known GIF (Graphics Interchange Format) or PNG (Portable Network Graphics) format. A significant portion of web images are in the format of GIF or PNG.

When browsing palettized images over low-bandwidth communication links, such as wireless links or dial-up links, progressive transmission of these palette images can support fast browsing since it enables the users to view complete versions of these images (but at a low resolution) before all progressively coded image data has been received. However, even though both GIF and PNG support an interlaced format, which refines the resolution of an image progressively by encoding the image in multiple passes and skipping a number of pixels in each pass, interlaced GIF and PNG are not in a progressive format in the strict sense that the color information of each pixel is refined progressively up to lossless recovery.

Rauschenbach investigated the progressive refinement of color information for palette images in his so-called MCQ (Mobile visualization Color Quantized format) method (U. Rauschenbach, "Compression of palettized images with progressive coding of the color information," in *Proc. SPIE Visual Communications and Image Processing (VCIP2000)*, Perth, Australia, June 2000, hereinafter referred to as [1]). Unlike the interlaced GIF and PNG formats, the refinement of color information in MCQ is done bit-plane by bit-plane, and allows the early recognition of shapes with fine details (e.g. text), normally after decoding a small portion of the compressed bit stream. Although MCQ supports progressive refinement of color information in contrast to resolution refinement, it only achieves a compression ratio comparable to GIF or PNG format. To improve the compression ratio while supporting the progressive transmission of palette images, Chen et al. (X. Chen, S. Kwong, and J. Feng, "A new compression scheme for color-quantized images," *IEEE Transactions on Circuits and System for Video Technology*, Vol. 12, No. 10, pp. 904~908, October 2002, hereinafter referred to as [2]) proposed a new color refinement scheme based on MCQ and the distortion-based hierarchical splitting color quantization algorithm pioneered by Orchard and Bouman (M. Orchard and C. Bouman, "Color quantization of images," *IEEE Transactions on Signal Processing*, Vol. 39, No. 12, pp. 2677~2690, December 1991, hereinafter referred to as [3]). Unlike MCQ where the color information is refined bit-plane by bit-plane with the number of bit-planes equal to the color depth of the palette, Chen's algorithm refines the color information color by color. For lossless compression of palette images, the color splitting algorithm proposed in [2] achieves around 30~40% size reduction compared to GIF or PNG format in addition to its decent feature of supporting the progressive transmission.

SUMMARY

In accordance with an aspect of an embodiment of the invention, there is provided a method for progressively encoding a digitized color image with M distinct colors allocated to a set of pixels using a data processing system, the digitized color image being provided by assigning each of the M distinct colors to an associated subset of pixels in the set of pixels. The method comprises: (a) initializing a tree structure by providing at least one starting leaf node comprising a set of colors from the M distinct colors; (b) determining at least one representative color for each starting leaf node; and (c) growing the tree structure by (i) selecting a leaf node n to become a non-leaf node n linked to two new leaf nodes based on an associated achievable cost, wherein the associated achievable cost is determined by 1) determining an associated change in distortion resulting from turning the leaf node into the non-leaf node linked to the two new leaf nodes; 2) determining an associated increase in entropy rate resulting from turning the leaf node into the non-leaf node linked to the two new leaf nodes; and, 3) determining the associated achievable cost based on the associated change in distortion and the associated increase in entropy rate; (ii) creating the two new leaf nodes by allocating each color in n to one of the two new leaf nodes; (iii) determining a representative color for each of the two new leaf nodes; and (iv) encoding the index information associated with the leaf node n, the representative colors of the two new leaf nodes, and information regarding a plurality of pixels of the digitized color image corresponding to the two representative colors of the two new leaf nodes.

In accordance with an embodiment of the invention, there is provided a computer program product for use on a computer to progressively encode a digitized color image with M distinct colors allocated to a set of pixels, the digitized color image being provided by assigning each of the M distinct colors to an associated subset of pixels in the set of pixels. The computer program product comprises a recording medium; and, means recorded on the recording medium for instructing the computer system to perform the steps of: (a) initializing a tree structure by providing at least one starting leaf node comprising a set of colors from the M distinct colors; (b) determining at least one representative color for each starting leaf node; and (c) growing the tree structure by (i) selecting a leaf node n to become a non-leaf node n linked to two new leaf nodes based on an associated achievable cost, wherein the associated achievable cost is determined by 1) determining an associated change in distortion resulting from turning the leaf node into the non-leaf node linked to the two new leaf nodes; 2) determining an associated increase in entropy rate resulting from turning the leaf node into the non-leaf node linked to the two new leaf nodes; and, 3) determining the associated achievable cost based on the associated change in distortion and the associated increase in entropy rate; (ii) creating the two new leaf nodes by allocating each color in n to one of the two new leaf nodes; (iii) determining a representative color for each of the two new leaf nodes; and (iv) encoding the index information associated with the leaf node n, the representative colors of the two new leaf nodes, and information regarding a plurality of pixels of the digitized color image corresponding to the two representative colors of the two new leaf nodes.

In accordance with a further embodiment of the invention, there is provided a system for progressively encoding a digitized color image with M distinct colors allocated to a set of pixels, the digitized color image being provided by assigning each of the M distinct colors to an associated subset of pixels in the set of pixels. The system comprises a recording medium; and, means including a processor for performing the steps of: (a) initializing a tree structure by providing at least one starting leaf node comprising a set of colors from the M distinct colors; (b) determining at least one representative color for each starting leaf node; and (c) growing the tree structure by (i) selecting a leaf node n to become a non-leaf node n linked to two new leaf nodes based on an associated achievable cost, wherein the associated achievable cost is determined by 1) determining an associated change in distortion resulting from turning the leaf node into the non-leaf node linked to the two new leaf nodes; 2) determining an associated increase in entropy rate resulting from turning the leaf node into the non-leaf node linked to the two new leaf nodes; and, 3) determining the associated achievable cost based on the associated change in distortion and the associated increase in entropy rate; (ii) creating the two new leaf nodes by allocating each color in n to one of the two new leaf nodes; (iii) determining a representative color for each of the two new leaf nodes; and (iv) encoding the index information associated with the leaf node n, the representative colors of the two new leaf nodes, and information regarding a plurality of pixels of the digitized color image corresponding to the two representative colors of the two new leaf nodes.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment and in which.

DETAILED DESCRIPTION OF THE INVENTION

Figure 1:
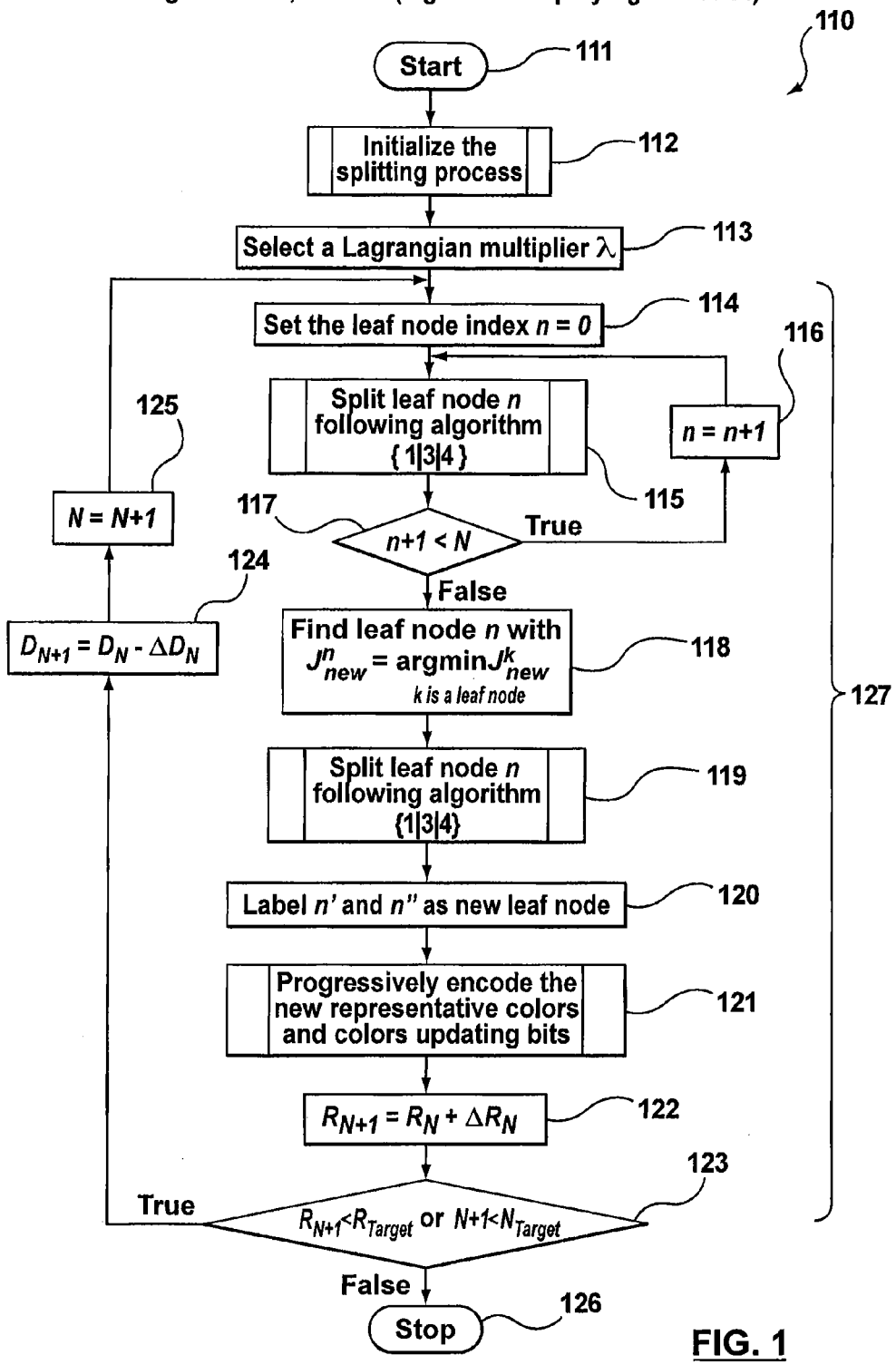
FIG. 1 in a flow chart, illustrates an overall algorithm for entropy constrained color splitting for palette images with color wise splitting between leaf nodes in accordance with an aspect of an embodiment of the invention.

Pictures with thousands or millions colors can be represented as true color images, storing the exact color for each pixel in the formats such as BMP (bitmap) and JPEG. In contrast, pictures containing only a few (typically up to 256) colors can be stored more efficiently as colormapped images or palettized images like the well known GIF (Graphics Interchange Format) or PNG (Portable Network Graphics) format. A significant portion of web images are in the format of GIF or PNG.

When browsing palettized images over low-bandwidth communication links, such as wireless links or dial-up links, progressive transmission of these palette images can support fast browsing since it enables the users to view complete versions of these images (but at a low resolution) before all progressively coded image data has been received. However, even though both GIF and PNG support an interlaced format, which refines the resolution of an image progressively by encoding the image in multiple passes and skipping a number of pixels in each pass, interlaced GIF and PNG are not in a progressive format in the strict sense that the color information of each pixel is refined progressively up to lossless recovery.

Rauschenbach investigated the progressive refinement of color information for palette images in his so-called MCQ (Mobile visualization Color Quantized format) method (U. Rauschenbach, "Compression of palettized images with progressive coding of the color information," in *Proc. SPIE Visual Communications and Image Processing (VCIP2000)*, Perth, Australia, June 2000, hereinafter referred to as [1]). Unlike the interlaced GIF and PNG formats, the refinement of color information in MCQ is done bit-plane by bit-plane, and allows the early recognition of shapes with fine details (e.g. text), normally after decoding a small portion of the compressed bit stream. Although MCQ supports progressive refinement of color information in contrast to resolution refinement, it only achieves a compression ratio comparable to GIF or PNG format. To improve the compression ratio while supporting the progressive transmission of palette images, Chen et al. (X. Chen, S. Kwong, and J. Feng, "A new compression scheme for color-quantized images," *IEEE Transactions on Circuits and System for Video Technology*, Vol. 12, No. 10, pp. 904~908, October 2002, hereinafter referred to as [2]) proposed a new color refinement scheme based on MCQ and the distortion-based hierarchical splitting color quantization algorithm pioneered by Orchard and Bouman (M. Orchard and C. Bouman, "Color quantization of images," *IEEE Transactions on Signal Processing*, Vol. 39, No. 12, pp. 2677~2690, December 1991, hereinafter referred to as [3]). Unlike MCQ where the color information is refined bit-plane by bit-plane with the number of bit-planes equal to the color depth of the palette, Chen's algorithm refines the color information color by color. For lossless compression of palette images, the color splitting algorithm proposed in [2] achieves around 30~40% size reduction compared to GIF or PNG format in addition to its decent feature of supporting the progressive transmission.

The color splitting algorithm in [2], [3] splits a representative color based on a distortion criterion only and does not consider the rate constraint at all. On the other hand, each color in a palette image is a 3-D vector. Color quantization or color splitting is essentially a vector quantization (VQ) problem (Y, Linde, A, Buzo, and R. Gray, "An algorithm for vector quantizer design," *IEEE Trans. Communications*, Vol. COM-28, No. 1, pp. 84-95, January 1980, hereinafter referred to as [4]). Entropy constrained vector quantization (ECVQ) or conditional entropy constrained vector quantization (CECVQ) proposed by Chou et al. (P. Chou, T. Lookabaugh, and R. Gray, "Entropy-constrained vector quantization," *IEEE Trans. Acous., Speech, and Signal Processing*, Vol. 37, No. 1, pp. 31-42, January 1989, hereinafter referred to as [5], and P. Chou and T. Lookabaugh, "Conditional entropy constrained vector quantization," Proceeding ICASSP 1990, pp. 197-200, April 1990, hereinafter referred to as [6]) can trade off the distortion with the entropy rate. To reduce the complexity of a normal vector quantization algorithm and make it feasible in practical applications, tree-structured vector quantization (TSVQ) algorithms (A. Buzo, A. Gray, Jr., R. Gray, and J. Markel, "Speech coding based upon vector quantization," *IEEE Trans. Acous., Speech, and Signal Processing*, Vol. ASSP-28, No. 5, pp. 562-574, October 1980, hereinafter referred to as [7], E. Riskin, and R. Gray, "A greedy tree growing algorithm for the design of variable rate vector quantizers," *IEEE Transactions on Signal Processing*, Vol. 39, No. 11, pp. 2500~2507, November 1991, hereinafter referred to as [8], and M. Mahesh, W. Pearlman, and L. Lu, "Variable-rate tree-structured vector quantizers," *IEEE Trans. Information Theory*, Vol. 41, No. 4, pp. 917-930, July 1995, hereinafter referred to as [9]) have been developed. In this approach, we apply the idea of ECVQ/CECVQ and TSVQ into a binary tree based color splitting scenario and develop four entropy constrained color splitting algorithms for palette images, which not only result in progressive transmission schemes but significantly outperform the scheme in [2] in R-D (rate-distortion) sense.

The rest of this document is organized as follows. The next section first describes the unconditional entropy constrained color splitting problem, and then provides two splitting algorithms using a fixed Lagrangian multiplier and a dynamically determined Lagrangian multiplier, respectively, in accordance with an embodiment. In Section III, in accordance with another embodiment, a pixel-wise conditional entropy constrained color splitting algorithm using a fixed Lagrangian multiplier is described. In Section IV, a color-wise conditional entropy constrained color splitting algorithm is presented according to another embodiment, which adds a restriction that all the pixels with the same color value in the original image can be updated by the same representative color values during the splitting process.

II. Unconditional Entropy Constrained Color Splitting

A binary tree structure, which can preserve more correlation between color indices than a linear structure, is used in [2] and [3] to represent the relationship of the colors of a palette image for the purpose of partitioning the color map, or equivalently, splitting a representative color progressively during the encoding process. Assume that the color map of a palette image is $C=\{c_0, c_1, \ldots, c_{M-1}\}$, where M is the number of distinct colors in the original palette image. Each color vector (or called color entry) $c_i$ corresponds to a color value $(r_i, g_i, b_i)$. Let $f(c_i)$ be defined as the occurrence number of $c_i$ in the given image. Our goal is to design a binary tree-based color splitting algorithm that minimizes the distortion subject to an unconditional entropy constraint. Such a color splitting algorithm partitions the color map C or splits the representative color of C progressively until the original palette image is losslessly reconstructed or a user-specified target number of colors is reached. The partitioning process yields a dynamic binary tree with each leaf node n corresponding to a subset $S_n$ of C such that $C=\cup_n S_n$ and $S_m \cap S_n = \emptyset$, where $m \neq n$, $0 \leq m$, $n < N$ and N is the total number of leaf nodes of the dynamic binary tree. Denote $q_n$ as the representative color of $S_n$ that is defined as the centroid of $S_n$. Then the dynamic binary tree, together with $q_n$, $0 \leq n < N$, gives rise to a tree-structured vector quantizer such that as the dynamic binary tree grows, the current vector quantizer is fully embedded into a subsequent high rate vector quantizer. A key question is how to grow the dynamic binary tree.

Starting from the root node, which represents the original color map C, we will grow the dynamic binary tree by splitting a desired leaf node each time. The process of selecting and splitting such a desired leaf node is conducted so as to minimize a Lagrangian cost $$J = D + \lambda \cdot R \quad (1)$$

where D and R are, respectively, the distortion and entropy of the reconstructed palette image corresponding to the newly created dynamic binary tree after one leaf node is split into two new leaf nodes. The Lagrangian multiplier $\lambda$, which represents the tradeoff of rate for distortion, may be determined dynamically for each leaf node being split or fixed during the entire splitting process. We consider both cases in this section.

Let $T_N$ be a binary tree having N leaf nodes and $T_{N+1}$ a binary tree generated from $T_N$ by splitting a leaf node n of $T_N$ into two child nodes n' and n". Let $d(c_i, q_n)$ be the color quantization error when a color entry $c_i=(r_i, g_i, b_i) \in C$ is replaced by a representative color $q_n=(\hat{r}_n, \hat{g}_n, \hat{b}_n)$. Specifically, $$d(c_i, q_n) = \|c_i - q_n\|^2 = (r_i - \hat{r}_n)^2 + (g_i - \hat{g}_n)^2 + (b_i - \hat{b}_n)^2 \quad (2)$$

Then the distortion reduction resulting from splitting the leaf node n into n' and n" is $$\Delta D_N = D_N - D_{N+1} \quad (3)$$

$$= \sum_{c_i \in S_n} f(c_i) d(c_i, q_n) - \sum_{c_i \in S_{n'}} f(c_i) d(c_i, q_{n'}) - \sum_{c_i \in S_{n''}} f(c_i) d(c_i, q_{n''})$$

where $D_N$ and $D_{N+1}$ are, respectively, the distortion corresponding to the trees $T_N$ and $T_{N+1}$; $q_{n'}$ and $q_{n''}$ are, respectively, the representative colors of $S_{n'}$ and $S_{n''}$. Note that $S_n = S_{n'} \cup S_{n''}$ and $S_{n'} \cap S_{n''} = \emptyset$. Furthermore, let $$f(S_{n'}) = \sum_{c_i \in S_{n'}} f(c_i) \text{ and } f(S_{n''}) = \sum_{c_i \in S_{n''}} f(c_i)$$

be, respectively, the numbers of pixels whose color indices fall into $S_{n'}$ and $S_{n''}$ when $S_n$ is partitioned into $S_{n'}$ and $S_{n''}$, and denote $f(S_n)=f(S_{n'})+f(S_{n''})$. Then the increment of the unconditional entropy resulting from splitting the leaf node n into n' and n" can be expressed as $$\Delta R_N = R_{N+1} - R_N \quad (4)$$

$$= -f(S_{n'})\log_2\left(\frac{f(S_{n'})}{f(S_n)}\right) - f(S_{n''})\log_2\left(\frac{f(S_{n''})}{f(S_n)}\right)$$

where $R_N$ and $R_{N+1}$ are, respectively, the entropy corresponding to the trees $T_N$ and $T_{N+1}$. Note that when splitting the leaf node n, neither $\Delta D_N$ nor $\Delta R_N$ depends on other leaf nodes in this binary tree-based color splitting.

An iterative process can be applied to split the leaf node n such that a minimum cost is achieved. The unconditional entropy constrained color splitting algorithm with a fixed λ is summarized as follows.

Algorithm 1: Unconditional Entropy Constrained Color Splitting Algorithm with a Fixed λ.

Step 1—initialization.

Given a palette image I and a target number of colors $N_{target}$ or a target rate $R_{target}$, obtain a binary tree $T_1$ which only has a root node. The representative color corresponding the root node is the centroid of the original color map, i.e.

$$q_0 = \sum_{i=0}^{M-1} (f(c_i)c_i)/f(S_0) \quad (5)$$

where $S_0=C$ and $$f(S_0) = \sum_{i=0}^{M-1} f(c_i).$$

Calculate the principal eigenvalue of the cluster covariance matrix associated to $S_0$ as discussed in [2] and [3]. Set N=1; $R_1=0$; and $D_1=\sigma^2$, where $\sigma^2$ is the variance of C. Select a convergence criterion ϵ and label the root node as a leaf node.

Step 2—Find the Minimum Achievable Cost for Splitting Each Leaf Node.

For each leaf node n of $T_N$, use the following steps to find the minimum achievable cost from tentatively splitting n.

Step 2.1

Initialize $J_{old}^n$ as $D_N+\lambda \cdot R_N$.

Step 2.2

For each color $c_i \in S_n$, assign $c_i$ to leaf node n' or n" based on the biased distortion measure. That is, assign $c_i$ to n' if $$d(c_i, q_{n'}) - \lambda\log_2\left(\frac{f(S_{n'})}{f(S_n)}\right) \leq d(c_i, q_{n''}) - \lambda\log_2\left(\frac{f(S_{n''})}{f(S_n)}\right) \quad (6)$$

Otherwise, assign $c_i$ to n". Note that $q_{n'}$, $q_{n''}$, $f(S_{n'})$, and $f(S_{n''})$ are unknown for the first iteration. Instead, the first iteration splits node n using distortion-based criterion as described in [2].

Step 2.3

Calculate the new representative colors, $q_{n'}$ and $q_{n''}$, of the leaf nodes n' and n" as the centriods of the new partition $S_{n'}$ and $S_{n''}$ obtained in Step 2.2, and update $f(S_{n'})$ and $f(S_{n''})$. Calculate $\Delta D_N$ and $\Delta R_N$ resulting from the current splitting using (3) and (4), which results in a new cost $J_{new}^n = (D_N - \Delta D_N) + \lambda \cdot (R_N + \Delta R_N)$. If $|J_{old}^n - J_{new}^n|/J_{old}^n \leq \epsilon$ or only one color entry is included in $S_{n'}$ or $S_{n''}$, the minimum achievable cost from splitting n is taken as $J_{new}^n$. Otherwise, replace $J_{old}^n$ with $J_{new}^n$ and go to step 2.2 for further iteration.

Step 3—grow $T_N$ to $T_{N+1}$.

Find leaf node n which achieves the minimum cost among all the leaf nodes, i.e., $$J_{new}^n = \arg\min_{k \text{ is a leaf node}} J_{new}^k.$$

Split n to obtain a new binary tree $T_{N+1}$ via the following iterative procedure.

Step 3.1

Initialize $J_{old}$ as $D_N+\lambda \cdot R_N$.

Step 3.2

For each color entry $c_i \in S_n$, assign $c_i$ to leaf node n' or n" using the biased distortion measure (6). Note that $q_{n'}$, $q_{n''}$, $f(S_{n'})$, and $f(S_{n''})$ in (6) are unknown for the first iteration. Instead, the first iteration splits node n using distortion-based criterion as described in [2].

Step 3.3

Calculate the new representative colors, $q_{n'}$ and $q_{n''}$, of the leaf nodes n' and n" as the centriods of the new partition $S_{n'}$ and $S_{n''}$ obtained in Step 3.2, and update $f(S_{n'})$ and $f(S_{n''})$. Calculate $\Delta D_N$ and $\Delta R_N$ resulting from the current splitting using (3) and (4), which results in a new cost $J_{new} = (D_N - \Delta D_N) + \lambda \cdot (R_N + \Delta R_N)$. If $|J_{old} - J_{new}|/J_{old} \leq \epsilon$ or only one color entry is included in $S_{n'}$ or $S_{n''}$, stop the iteration of splitting the leaf node n, extend the node n into two new leaf nodes labeled as n' and n" respectively, and go to step 4. Otherwise, replace $J_{old}$ with $J_{new}$ and go to step 3.2 for further iterations.

Step 4—progressively transmitting (or merely encoding and then, say, storing) the color updating bits.

Send out the node index being split (i.e., n), the new representative colors (i.e., $q_{n'}$ and $q_{n''}$) as well as the color updating bits for pixels whose color fall into $S_n$. Update the total bit rate as $R_{N+1} = R_N + \Delta R_N$. If $N+1 < N_{target}$ or $R_{N+1} < R_{target}$, then update the new distortion as $D_{N+1} = D_N - \Delta D_N$; increase N by 1; and then go to step 2 for further splitting. Otherwise, stop the splitting and transmitting process.

During the above splitting process, Algorithm 1 employs a fixed λ, which has the physical meaning of the slope of the distortion-rate function. Another approach is to use a variable λ and perform the splitting so as to find a good trade-off between the overall distortion decrease and rate increase. In other words, when we grow $T_N$ into $T_{N+1}$, we aim at maximizing λ, where $$\lambda = \frac{D_N - D_{N+1}}{R_{N+1} - R_N}, \quad (7)$$

over all possible iterations at each leaf node of $T_N$ and across all leaf nodes of $T_N$. At each leaf node of $T_N$, we find its maximum achievable λ through an iterative process, which is similar to the one to be used when the node is to be split. Specifically, the splitting begins with the assumption that λ is zero. The two representative colors that minimize (1) for this value of λ are found. The decrease in distortion and increase in rate are calculated. The new value of λ is the ratio of the decrease in distortion to the increase in rate. The splitting is now redone with this new value of λ. This iterative process continues until λ does not increase. The converged value is then regarded as the maximum achievable λ at this leaf node. The actual leaf node to be split is the one giving rise to the maximum converged value across all leaf nodes of $T_N$. Algorithm 2 below gives the detailed description.

Algorithm 2: Unconditional Entropy Constrained Color Splitting Algorithm with a Dynamically Determined λ.

Step 1—initialization.

Given a palette image I and a target number of colors $N_{target}$ or a target rate $R_{target}$, obtain a binary tree $T_1$ which only has the root node. The representative color corresponding to the root node is the centroid of the color map that can be calculated using (5). Set N=1; $R_1$=0; and $D_1$=$\sigma^2$. Select a convergence criterion ϵ and label the root node as a leaf node.

Step 2—find the maximum achievable λ for each new leaf node.

For each leaf node n of $T_N$, use the following steps to find the maximum attainable $\lambda_{n,max}$ from splitting n as if the leaf node n is to be split.

Step 2.1
Set $\lambda_n^t$=0 where t in $\lambda_n^t$ is an iterative index.

Step 2.2
For each color $c_i \in S_n$, assign $c_i$ to an intended new leaf node n' or n'' based on the biased distortion measure. That is, assign $c_i$ to n' if $$d(c_i, q_{n'}) - \lambda_n^t \log_2\left(\frac{f(S_{n'})}{f(S_n)}\right) \le d(c_i, q_{n''}) - \lambda_n^t \log_2\left(\frac{f(S_{n''})}{f(S_n)}\right) \quad (8)$$

Otherwise, assign $c_i$ node n''. Note that $q_{n'}$ and $q_{n''}$ are unknown for the first iteration. Instead, the first iteration splits the leaf node n using the distortion-based spitting algorithm discussed in [2]. Alternatively, we may perturb $q_n$ into $q_{n'}$, $q_{n''}$ for the first iteration. Even though $f(S_{n'})$ and $f(S_{n''})$ are also unknown for the first iteration, the algorithm works fine since $\lambda_n^t$ is assumed to be zero for the first iteration.

Step 2.3
Update the new representative colors, $q_{n'}$ and $q_{n''}$, of the leaf nodes n' and n'' to be the centroids of the new partition $S_{n'}$ and $S_{n''}$ obtained in Step 2.2, respectively, and update $f(S_{n'})$ and $f(S_{n''})$ into the numbers of pixels whose colors fall into $S_{n'}$ and $S_{n''}$ obtained in Step 2.2, respectively. Calculate $\Delta D_N$ and $\Delta R_N$ resulting from the current splitting using (3) and (4). If $$\frac{\Delta D_N}{\Delta R_N} > \lambda_n^t, \text{ set } \lambda_n^t = \frac{\Delta D_N}{\Delta R_N}$$

and then go to step 2.2 for further iterations. Otherwise, take the current $\lambda_n^t$ as the maximum achievable $\lambda_{n,max}$ at the leaf node n.

Step 3—grow $T_N$ to $T_{N+1}$.

Find the leaf node n that has the maximum value $\lambda_{n,max}$ among all the leaf nodes of $T_N$, i.e., $$\lambda_{n,max} = \arg\max_{k \text{ is a leaf node}} \lambda_{k,max}.$$

Split the leaf node n to obtain a new binary tree $T_{N+1}$ via the following iteration process.

Step 3.1

Initialize $J_{old}$ as $D_N + \lambda_{n,max} \cdot R_N$.

Step 3.2
For each color entry $c_i \in S_n$, assign $c_i$ to an intended new leaf node n' or n'' based on the resulting Lagrangian cost. That is, assign $c_i$ to node n' if $$d(c_i, q_{n'}) - \lambda_{n,max}\log_2\left(\frac{f(S_{n'})}{f(S_n)}\right) \le d(c_i, q_{n''}) - \lambda_{n,max}\log_2\left(\frac{f(S_{n''})}{f(S_n)}\right) \quad (9)$$

Otherwise, assign $c_i$ to node n''. Note that $q_{n'}$, $q_{n''}$, $f(S_{n'})$, and $f(S_{n''})$ are unknown for the first iteration. Instead, the first iteration splits node n using the distortion-based criterion as described in [2].

Step 3.3
Update the new representative colors, $q_{n'}$ and $q_{n''}$, of the leaf nodes n' and n'' to be the centriods of the new partition $S_{n'}$ and $S_{n''}$ obtained in Step 3.2, respectively, and update $f(S_{n'})$ and $f(S_{n''})$ into the numbers of pixels whose colors fall into $S_{n'}$ and $S_{n''}$ obtained in Step 3.2, respectively. Calculate $\Delta D_N$ and $\Delta R_N$ resulting from current splitting using (3) and (4), which results in a new cost $J_{new}=(D_N-\Delta D_N)+\lambda_{n,max}\cdot(R_N+\Delta R_N)$. If $|J_{old}-J_{new}|/J_{old} \le \epsilon$, or only one color entry is included in $S_{n'}$ or $S_{n''}$, stop the iteration of splitting the leaf node n, extend the node n into two new leaf nodes labeled as n' and n'' respectively, and go to step 4. Otherwise, replace $J_{old}$ with $J_{new}$ and go to step 3.2 for further iterations.

Step 4—progressively transmitting (or merely encoding and then, say, storing) the color updating bits.

Send out the node index being split (i.e., n), the new representative colors (i.e., $q_{n'}$ and $q_{n''}$) as well as the update bits for pixels whose colors fall into $S_n$. Update the total bit rate as $R_{N+1}=R_N+\Delta R_N$. If $N+1<N_{target}$ or $R_{N+1}<R_{target}$, then update the new distortion as $D_{N+1}=D_N-\Delta D_N$; increase N by 1; and then go to step 2. Otherwise, stop the splitting and transmitting process.

III. Conditional Entropy Constrained Color Splitting: Pixelwise Splitting

In practical applications, context-based arithmetic coding like the one used in [2] is usually employed to encode the update bits in the entropy coding stage in Algorithms 1 and 2 so as to obtain a high compression gain. In Algorithms 1 and 2, however, the rate constraint used is an unconditional entropy. If we could use a conditional entropy as the constraint in a color splitting algorithm, the entropy used in the splitting process would match the entropy of the encoding stage more accurately. Consequently, better results in the rate-distortion sense can be obtained. In this section, we will extend the unconditional entropy constrained color splitting algorithm with a fixed λ to the conditional entropy constrained scenario.

For conditional entropy constrained color splitting, we will consider two separate cases. We call them pixel-wise splitting and color-wise splitting, respectively, in what follows. Pixel-wise splitting means pixels with the same color in the original image may be mapped to different leaf nodes during the splitting process. In other words, pixels with the same color in the original image may be updated by different representative colors during the splitting process based on different context. For a palette image with M distinct colors, in general, the original image may not be perfectly reconstructed after M−1 steps of node splitting even though the original palette image can be losslessly reconstructed eventually. On the other hand, color-wise splitting means all the pixels with the same color in the original image must be mapped to the same node during the splitting process. In other words, all the pixels with the same color in the original image will be updated by the same representative colors during the splitting process. For a palette image with M distinct colors, the original image is guaranteed to be perfectly reconstructed after M−1 steps of node splitting. We will develop the pixel-wise conditional entropy constrained color splitting algorithm in this section and consider the color-wise conditional entropy constrained color splitting algorithm in Section IV. We only consider using a fixed λ in both cases.

The main difference between the unconditional entropy constrained color splitting algorithm and conditional entropy constrained color splitting algorithm is the calculation of the increase of entropy rate $\Delta R_N$ shown in (4) and the biased distortion measure as shown in (6). To calculate the conditional entropy rate during the splitting process, we may use an arbitrary number of neighboring pixels for the context modeling purpose. In what follows, we calculate the conditional entropy rate conditioned on the left and upper pixels only. The extension to more neighboring pixels is straightforward.

As indicated by the name, a pixel-wise conditional entropy constrained color splitting algorithm updates the color information in a pixel-wise manner. Let $c_p$ be the original color of pixel p in C and denote $\Psi_n$ as the pixel set corresponding to the leaf node n during the splitting process. For a pixel $p \in \Psi_n$, whose left and upper neighboring pixels' representative color indices are u and v in the current reconstructed image, mapping p to the leaf node n' results in an increase of entropy under context u and v as $$H_{n'}^{u,v} = -\log_2\left(\frac{f_{u,v}(\Psi_{n'})}{f_{u,v}(\Psi_{n'}) + f_{u,v}(\Psi_{n''})}\right) \quad (10)$$

where $f_{u,v}(\Psi_{n'})$ and $f_{u,v}(\Psi_{n''})$ are respectively the number of pixels mapped to the leaf node n' or n" under context u and v from the previous iteration. Similarly, mapping p to the leaf node n" results in an increase of entropy under context u and v as $$H_{n'}^{u,v} = -\log_2\left(\frac{f_{u,v}(\Psi_{n''})}{f_{u,v}(\Psi_{n'}) + f_{u,v}(\Psi_{n''})}\right) \quad (11)$$

Each pixel $p \in \Psi_n$ is mapped to the leaf node n' or n" separately based on the resulting incremental Lagrangian cost. Pixel-wise conditional entropy constrained color splitting algorithm is summarized as follows.
Algorithm 3: Pixel-wise Conditional Entropy Constrained Color Splitting Algorithm with Fixed λ.
    Step 1—initialization.
    Given a palette image/with color map C and a target number of colors $N_{target}$ or a target rate $R_{target}$, obtain a binary tree $T_1$ which only has a root node. Initialize N as 1. Set $R_1=0$ and $D_1=\sigma^2$. Calculate the representative color $q_0$ and the principal eigenvalue of the cluster covariance matrix associated to the root node. Select a convergence criterion ε and label the root node as a leaf node.
    Step 2—find the minimum achievable cost for splitting each leaf node.
    For each leaf n of $T_N$, use the following steps to find the minimum achievable cost from tentatively splitting n.
Step 2.1

Initialize $J_{old}^n$ as $D_N + \lambda \cdot R_N$.

Step 2.2
For each pixel $p \in \Psi_n$, whose left and upper neighboring pixels' representative colors are u and v in current reconstructed image, map p to leaf node n' or n" based on the biased distortion measure. That is, map p to node n' if $$d(c_p, q_{n'}) + \lambda \cdot H_{n'}^{u,v} \leq d(c_p, q_{n''}) + \lambda \cdot H_{n''}^{u,v} \quad (12)$$

Otherwise, map p to node n". Note that $q_{n'}$, $q_{n''}$, $H_{n'}^{u,v}$, and $H_{n''}^{u,v}$ are unknown for the first iteration. Instead, the distortion-based criterion is used for the first iteration.
Step 2.3
Update the new representative colors, $q_{n'}$ and $q_{n''}$, of the leaf nodes n' and n" and the statistics $f_{u,v}(\Psi_{n'})$ and $f_{u,v}(\Psi_{n''})$. Calculate $H_{n'}^{u,v}$ and $H_{n''}^{u,v}$ using (10) and (11). Calculate $\Delta D_N$ and $\Delta R_N$ where $$\Delta D_N = \sum_{p \in \Psi_n} d(c_p, q_n) - \sum_{p \in \Psi_{n'}} d(c_p, q_{n'}) - \sum_{p \in \Psi_{n''}} d(c_p, q_{n''}) \quad (13)$$

and $$\Delta R_n = \sum_{u,v} [f_{u,v}(\Psi_{n'}) \cdot H_{n'}^{u,v} + f_{u,v}(\Psi_{n''}) \cdot H_{n''}^{u,v}], \quad (14)$$

which results in a new cost $J_{new}^n = (D_N - \Delta D_N) + \lambda \cdot (R_N + \Delta R_N)$. If $|J_{old}^n - J_{new}^n|/J_{old}^n \leq \epsilon$ or only one pixel is included in $\Psi_{n'}$ or $\Psi_{n''}$, the minimum achievable cost from splitting n is taken as $J_{new}^n$. Otherwise, replace $J_{old}^n$ with $J_{new}^n$ and go to step 2.2 for further iteration.
    Step 3—grow $T_N$ to $T_{N+1}$.
    Find leaf node n which achieves the minimum cost among all the leaf nodes, i.e., $$J_{new}^n = \arg\min_{k \text{ is a leaf node}} J_{new}^k.$$

Split n to obtain a new binary tree $T_{N+1}$ via the following iterative procedure.
Step 3.1

Initialize $J_{old}$ as $D_N + \lambda \cdot R_N$.

Step 3.2
For each pixel $p \in \Psi_n$, whose left and upper neighboring pixels' representative colors are u and v in current reconstructed image, map p to leaf node n' or n" using the biased distortion measure (12). Note that $q_{n'}$, $q_{n''}$, $H_{n'}^{u,v}$, and $H_{n''}^{u,v}$ in (12) are unknown for the first iteration. Instead, the distortion-based criterion is used for the first iteration.
Step 3.3
Update the new representative colors, $q_{n'}$ and $q_{n''}$, of the leaf nodes n' and n" and the statistics $f_{u,v}(\Psi_{n'})$ and $f_{u,v}(\Psi_{n''})$. Calculate $H_{n'}^{u,v}$ and $H_{n''}^{u,v}$ using (10) and (11). Calculate $\Delta D_N$ and $\Delta R_N$ resulting from the current splitting using (13) and (14), which results in a new cost $J_{new} = (D_N - \Delta D_N) + \lambda \cdot (R_N + \Delta R_N)$. If $|J_{old} - J_{new}|/J_{old} \leq \epsilon$, or only one pixel is included in $\Psi_{n'}$ or $\Psi_{n''}$, stop the iteration of splitting node n, label nodes n' and n" as new leaf node, and go to step 4. Otherwise, replace $J_{old}$ with $J_{new}$ and go to step 3.2 for further iterations.
    Step 4—progressively transmitting (or merely encoding and then, say, storing) the color updating bits.
    Send out the node index being split (i.e., n), the new representative colors (i.e., $q_{n'}$ and $q_{n''}$) as well as the color updating bits for all pixels $p \in \Psi_n$. Update the total bit rate as $R_{N+1} = R_N + \Delta R_N$. If $N+1 < N_{target}$ or $R_{N+1} < R_{target}$, then update the new distortion as $D_{N+1} = D_N - \Delta D_N$; increase N to by 1; and then go to step 2 for further splitting. Otherwise, stop the splitting and transmitting process.

IV. Conditional Entropy Constrained Color Splitting: Color-wise Splitting

Pixel-wise splitting means the pixels with the same color value in the original image may be updated to their final color through different intermediate representative colors. In other words, the pixels with the same color in the original image may be mapped to different nodes during the splitting process. In order to ensure the same color in the original image will be updated by the same representative colors during the splitting process, we may add a restriction that all the pixels with the same color in the original image will be mapped to the same node during the splitting process. This leads to the color-wise conditional entropy constrained splitting algorithm that will be described in detail in this section.

During splitting a leaf node n into n' and n", the pixels corresponding to a color entry $c_i \in S_n$ may have different contexts u and v in the current reconstructed image, where each pixel p ($c_p=c_i$) corresponds to an entropy $H_{n'}^{u,v}$ or $H_{n''}^{u,v}$ as defined in (10) and (11). Assign $c_i$ to n' results in an increase of entropy per pixel as $$H_{n'}^{c_i} = \frac{\sum_{c_p=c_i} H_{n'}^{u,v}}{f(c_i)} \quad (15)$$

Similarly, assign $c_i$ to n" results in an increase of entropy per pixel as $$H_{n''}^{c_i} = \frac{\sum_{c_p=c_i} H_{n''}^{u,v}}{f(c_i)} \quad (16)$$

Each color entry $c_i \in S_n$ is still mapped to leaf node n' or n" to minimize the resulting Lagrangian cost through an iterative process. The color-wise conditional entropy constrained color splitting algorithm is summarized as follows.

Algorithm 4: Color-wise Conditional Entropy Constrained Color Splitting Algorithm with a Fixed $\lambda$.

Step 1—initialization.

Given a palette image I with color map C and a target number of colors $N_{target}$ or a target rate $R_{target}$, obtain a binary tree $T_1$ which only has a root node. Set $S_0=C$ and $N=1$. Set $R_1=0$ and $D_1=\sigma^2$. Calculate the representative color of $S_0$ using Equation (5) and the principal eigenvalue of the cluster covariance matrix associated to $S_0$. Select a convergence criterion $\epsilon$ and label the root node as a leaf node.

Step 2—find the minimum achievable cost for splitting each leaf node.

For each leaf node n of $T_N$, use the following steps to find the minimum achievable cost from tentatively splitting n.

Step 2.1

Initialize $J_{old}^n$ as $D_N+\lambda \cdot R_N$.

Step 2.2

For each color $c_i \in S_n$, assign $c_i$ to leaf node n' or n" based on the biased distortion measure. That is, assign $c_i$ to n' if $$d(c_i,q_{n'})+\lambda \cdot H_{n'}^{c_i} \leq d(c_i,q_{n''})+\lambda \cdot H_{n''}^{c_i} \quad (17)$$

Otherwise, assign $c_i$ to n". Note that $q_{n'}$, $q_{n''}$, $H_{n'}^{c_i}$, and $H_{n''}^{c_i}$ are unknown for the first iteration. Instead, distortion-based criterion is used for the first iteration.

Step 2.3

Update the new representative colors, $q_{n'}$ and $q_{n''}$, of the leaf nodes n' and n", and the statistics $f_{u,v}(\Psi_{n'})$ and $f_{u,v}(\Psi_{n''})$. Calculate $H_{n'}^{c_i}$ and $H_{n''}^{c_i}$ using (15) and (16), which in turn use (10) and (11). Calculate $\Delta D_N$ and $\Delta R_N$ resulting from current splitting using (3) and (14), which results in a new cost $J_{new}^n=(D_N-\Delta D_N)+\lambda \cdot (R_N+\Delta R_N)$. If $|J_{old}^n-J_{new}^n|/J_{old}^n \leq \epsilon$ or only one color entry is included in $S_{n'}$ or $S_{n''}$, the minimum achievable cost from splitting n is taken as $J_{new}^n$. Otherwise, replace $J_{old}^n$ with $J_{new}^n$ and go to step 2.2 for further iteration.

Step 3—grow $T_N$ to $T_{N+1}$.

Find leaf node n which achieves the minimum cost among all the leaf nodes, i.e., $$J_{new}^n = \arg\min_{k \text{ is a leaf node}} J_{new}^k.$$

Split n to obtain a new binary tree $T_{N+1}$ via the following iterative procedure.

Step 3.1

Initialize $J_{old}$ as $D_N+\lambda \cdot R_N$.

Step 3.2

For each color $c_i \in S_n$, assign $c_i$ to leaf node n' or n" using the biased distortion measure (17). Note that $q_{n'}$, $q_{n''}$, $H_{n'}^{c_i}$, and $H_{n''}^{c_i}$ are unknown for the first iteration. Instead, distortion-based criterion is used for the first iteration.

Step 3.3

Update the new representative colors, $q_{n'}$ and $q_{n''}$, of the leaf nodes n' and n", and the statistics $f_{u,v}(\Psi_{n'})$ and $f_{u,v}(\Psi_{n''})$. Calculate $H_{n'}^{c_i}$ and $H_{n''}^{c_i}$ using (15) and (16). Calculate $\Delta D_N$ and $\Delta R_N$ resulting from current splitting using (3) and (14), which results in a new cost $J_{new}=(D_N-\Delta D_N)+\lambda \cdot (R_N+\Delta R_N)$. If $|J_{old}-J_{new}|/J_{old} \leq \epsilon$, or only one color entry is included in $S_{n'}$ or $S_{n''}$, stop the iteration of splitting node n, label nodes n' and n" as new leaf node, and go to step 4. Otherwise, replace $J_{old}$ with $J_{new}$ and go to step 3.2 for further iterations.

Step 4—progressively transmitting (or merely encoding and then, say, storing) the color updating bits.

Send out the node index being split (i.e., n), the new representative colors (i.e., $q_{n'}$ and $q_{n''}$) as well as the color updating bits for pixels whose color fall into $S_n$. Update the total bit rate as $R_{N+1}=R_N+\Delta R_N$. If $N+1<N_{target}$ or $R_{N+1}<R_{target}$, then update the new distortion as $D_{N+1}=D_N-\Delta D_N$, increase N to by 1; and then go to step 2 for further splitting. Otherwise, stop the splitting and transmitting process.

Referring now to FIG. 1, the basic operation of algorithms 1, 3, and 4 will be described. Algorithms 1, 3, and 4 all employ a fixed Lagrangian multiplier $\lambda$ representing a trade-off between distortion and entropy rate. Process 110 shows the steps common to these three algorithms.

Process 110 begins at step 111 and immediately progresses to step 112 where the splitting process is initialized. Step 112 will be described in greater detail below with reference to FIG. 3. Once the splitting process is initialized, the Lagrangian multiplier $\lambda$ is selected at step 113. The first iteration of sub-process 127 then begins.

Each iteration of sub-process 127 splits a leaf node n by creating two new leaf nodes n' and n" and progressively encodes the new representative colors for the new leaf nodes as well as information regarding which pixels in the image should be updated using these colors. Once n is split, it becomes a non-leaf node.

The first objective of sub-process 127 is to determine which leaf node must be split. This is done in steps 114-118. At step 114, a leaf node index n is initialized to 0. Leaf node n (the leaf node with index n) is then split according to the splitting process in algorithm 1, 3, or 4 at step 115. Each of these splitting processes are described in greater detail below with reference to FIGS. 4, 7 and 8 respectively. Each of these processes includes the determination of a minimum cost for splitting node n into two new leaf nodes based on the associated change in distortion and the associated increase in the entropy rate. Once the splitting of leaf node n is complete, sub-process 127 determines whether or not all leaf nodes in the tree structure have been split at step 117 using the variable N, representing the number of leaf nodes in the tree structure, which is initialized at step 314 of process 310 described below with reference to FIG. 3. If all N leaf nodes have not been split, leaf node index n is incremented by one at step 116 and process 110 returns to step 115 to continue the splitting process. Once all leaf nodes in the tree structure have been split, process 110 continues to step 118. At step 118, the leaf node n which achieves the lowest minimum cost among all the leaf nodes is selected.

Once the leaf node n with the lowest minimum cost has been determined, n is split according to the splitting process in algorithm 1, 3, or 4 at step 119. Each of these splitting algorithms are described in greater detail below with reference to FIGS. 4, 7 and 8 respectively. During this process, leaf node n becomes a non-leaf node and two new leaf nodes, n' and n'', are created. At step 120, leaf nodes n' and n'' are labeled as new leaf nodes.

At step 121, the new representative colors are progressively encoded along with the color updating bits. Step 121 will be described in greater detail below with reference to FIG. 9.

At step 122, the entropy rate for the new tree structure which includes n' and n'' is calculated by adding the entropy rate for the old tree structure before n was split and the increase in entropy caused by the splitting of n into n' and n''.

At step 123, the entropy rate for the new tree structure, calculated in step 122, may be compared to a target entropy rate set during the initialization process described below with reference to FIG. 3. Alternatively, the number of representative colors, which corresponds to the number of leaf nodes in the new tree structure, is compared to a target number of colors set during the initialization process described below with reference to FIG. 3. If the new entropy rate is greater than or equal to the target entropy rate or if the number of colors in the new tree structure is greater than or equal to the target number of colors then process 110 proceeds to step 126 and terminates. Otherwise, process 110 continues to step 124.

At step 124, the distortion for the new tree structure is calculated as the sum of the distortion of the tree structure before node n was split and the decrease is distortion resulting from splitting node n into leaf nodes n' and n''. The number of leaf nodes in the tree structure N is then incremented by one at step 125, the process returns to step 114 and the splitting process continues.

Figure 2:
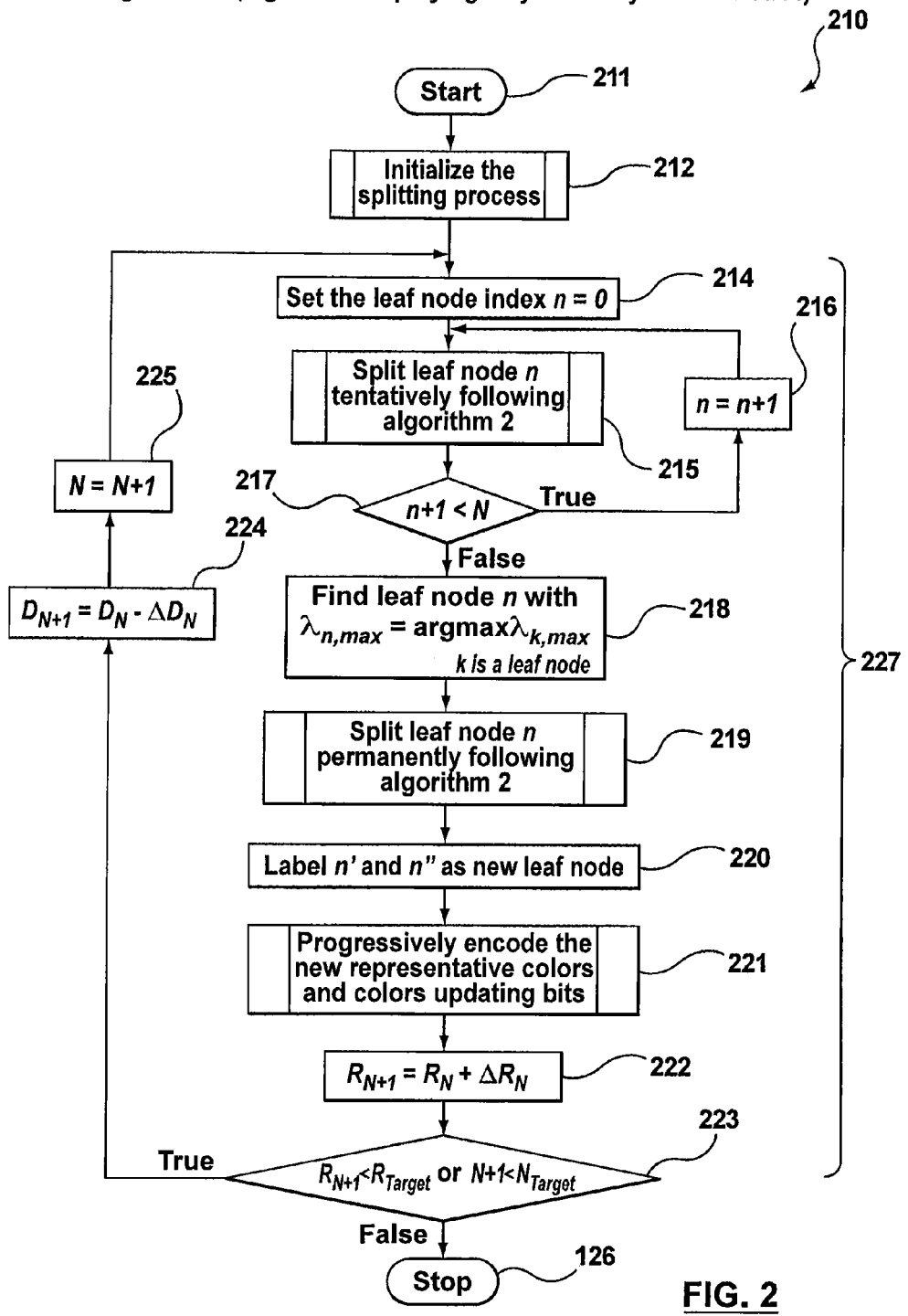
FIG. 2 in a flow chart, illustrates an overall algorithm for entropy constrained color splitting for palette images with pixel wise splitting between leaf nodes in accordance with a further aspect of a further embodiment of the invention.

Referring now to FIG. 2, the basic operation of algorithm 2 will be described. Process 210 functions similarly to process 110 except that process 210 employs a dynamically determined Lagrangian multiplier rather than a fixed Lagrangian multiplier as in process 110.

Process 210 begins at step 211 and immediately progresses to step 212 where the splitting process is initialized. Step 212 will be described in greater detail with reference to FIG. 3. The first iteration of sub-process 227 then begins.

Each iteration of sub-process 227 splits a leaf node n by creating two new leaf nodes n' and n'' and progressively encodes the new representative colors for the new leaf nodes along with information regarding which pixels in the image should be updated using these colors. Once n is split, it becomes a non-leaf node.

The first objective of sub-process 227 is to determine which leaf node must be split. This is done in steps 214-218.

At step 214, a leaf node index n is initialized to 0. Leaf node n (the leaf node with index n) is then tentatively split according to the tentative splitting process for algorithm 2 at step 215. This tentative splitting process is described in greater detail below with reference to FIG. 5. The tentative splitting processes includes the determination of a maximum achievable Lagrangian multiplier $\lambda_{n,max}$ for each leaf node n. Once the tentative splitting of leaf node n is complete, the process determines whether or not all leaf nodes in the tree structure have been tentatively split at step 217 using the variable N, representing the number of leaf nodes in the tree structure, which is initialized at step 314 of process 310 described below with reference to FIG. 3. If all N leaf nodes have not been tentatively split, leaf node index n is incremented at step 216, process 210 returns to step 215 and the tentative splitting process continues. Once all N leaf nodes in the tree structure have been tentatively split, process 210 proceeds to step 218. At step 218, the leaf node n with the highest maximum achievable Lagrangian multiplier $\lambda_{n,max}$, calculated in step 215, is selected.

Once the leaf node n with the highest maximum achievable Lagrangian multiplier $\lambda_{n,max}$ has been determined, leaf node n is permanently split according to the permanent splitting process for algorithm 2 at step 219. The permanent splitting process is described in greater detail below with reference to FIG. 6. During the permanent splitting process, leaf node n becomes a non-leaf node and two new leaf nodes, n' and n'', are created. At step 220, leaf nodes n' and n'' are labeled as new leaf nodes.

At step 221, the new representative colors are progressively encoded along with the color updating bits. Step 221 will be described in greater detail below with reference to FIG. 9.

At step 222, the entropy rate for the new tree structure which includes n' and n'' is calculated by adding the entropy rate for the old tree structure before n was split and the increase in entropy caused by the splitting of n into n' and n''. The increase in entropy is calculated using equation (4).

At step 223, the entropy rate for the new tree structure, calculated in step 222, may be compared to a target entropy rate set during the initialization process described below with reference to FIG. 3. Alternatively, the number of representative colors, which corresponds to the number of leaf nodes in the new tree structure, is compared to a target number of colors set during the initialization process described below with reference to FIG. 3. If the new entropy rate is greater than or equal to the target entropy rate or if the number of colors in the new tree structure is greater than or equal to the target number of colors then process 210 proceeds to step 226 and terminates. Otherwise, the distortion for the new tree structure is calculated at step 224 as the sum of the distortion of the tree structure before node n was split and the decrease is distortion resulting from splitting node n into leaf nodes n' and n''. The number of leaf nodes in the tree structure N is then incremented at step 225, process 210 returns to step 214 and the splitting process continues.

Figure 3:
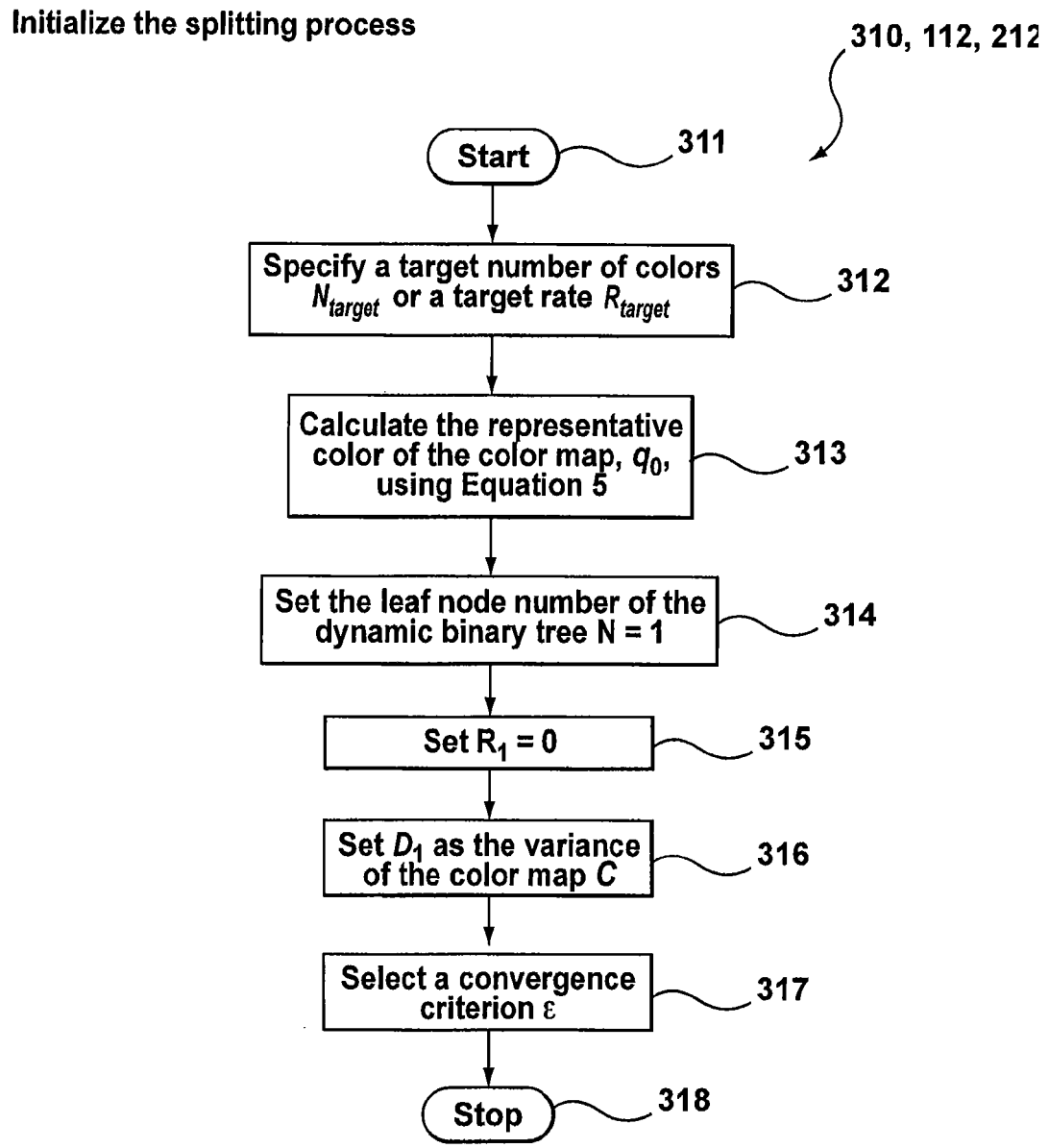
FIG. 3 in a flow chart, illustrates an initialization sub-process of the methods of FIGS. 1 and 2.

Referring now to FIG. 3, the initialization of the splitting process will be described. Process 310 begins at step 311 and immediately progresses to step 312.

At step 312, a target number of colors $N_{target}$ or a target entropy rate $R_{target}$ are specified. These values will be used in steps 123 and 223 of processes 110 and 210 respectively to determine when the splitting process should be terminated.

A number of variables are then initialized. At step 313, the initial representative color for the starting leaf node is calculated, using equation 5, as the centroid of the original color map for the image. The number of leaf nodes in the tree structure, N, is initialized to 1 at step 314 and the entropy rate for the initial tree structure is set to 0 in step 315. The distortion associated with the initial tree structure is set to be the variance of the original color map for the image at step 316. At step 317 a convergence criterion E is selected. The convergence criterion is used in steps 422, 622, 723 and 824 of processes 410, 610, 710 and 810 respectively to determine when the splitting process for a node should terminate. These processes will be described in detail below. Once these variables have been initialized, process 310 continues to step 318 and terminates.

Figure 4:
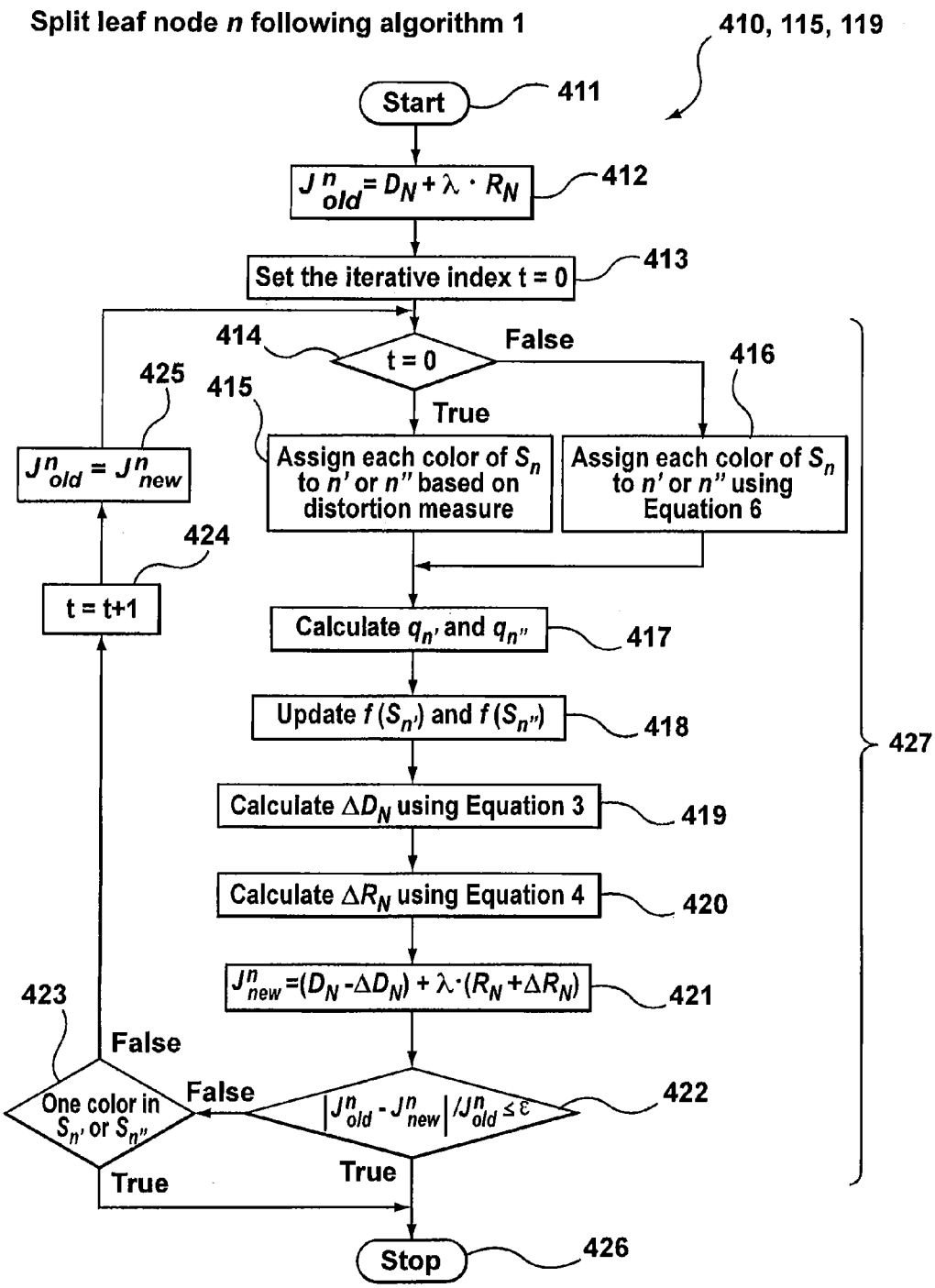
FIG. 4 in a flow chart, illustrates an example of a sub-process of the method of FIG. 1 in which a leaf node is split.

Referring now to FIG. 4, the process of splitting a leaf node n according to algorithm 1 will be described. Specifically, process 410 transforms n into a non-leaf node, creates two new leaf nodes n' and n" and assigns each color in n to either n' or n". The set of colors assigned to a node n is denoted as $S_n$.

Process 410 begins at step 411 and immediately progresses to step 412. At step 412, a cost measurement $J''_{old}$ is initialized to the value attained by adding the distortion of the current tree structure to a product obtained by multiplying the entropy rate of the current tree structure by the Lagrangian multiplier $\lambda$ selected in step 113 of process 110.

At step 413, an iterative index t, used to keep track of the number of iterations of sub-process 427, is initialized to 0. The iterative index t is used at step 414 to determine whether this is the first iteration of sub-process 427 (i.e. t=0). If this is the first iteration of sub-process 427, at step 415, each color in n is assigned to n' or to n" based on a distortion based criterion as described in [2]. In subsequent iterations of sub-process 427, where t≠0, each color in n is assigned to n' or n" based on the biased distortion measure of equation (6) at step 416.

Next, a number of values are calculated based on n' and n". First the new representative colors for n' and n", $q_{n'}$ and $q_{n''}$ are calculated at step 417. At step 418, the number of occurrences in the original image of each color in n' and n", $f(S_{n'})$ and $f(S_{n''})$ respectively, are updated. At step 419, the reduction in distortion resulting from splitting node n into n' and n", $\Delta D_N$ is calculated using equation (3). At step 420, the increase in entropy rate resulting from splitting node n into n' and n", $\Delta R_N$ is calculated using equation (4). Finally, at step 421, the values of $\Delta D_N$ and $\Delta R_N$ calculated in steps 419 and 420 respectively are used to calculate a cost measure $J''_{new}$ representing the cost of the new tree structure.

At step 422, the convergence criterion E, selected in step 317 of process 310, is used to determine whether sub-process 427 should be terminated. If the change in cost resulting from the most recent split, calculated as the difference between $J''_{new}$ and $J''_{old}$ divided by $J''_{old}$, is less than or equal to the convergence criterion E then another iteration of sub-process 427 is not required and the process 410 proceeds to step 426 and terminates. Otherwise, process 410 proceeds to step 423.

At step 423, the sets of colors assigned to n' and n", $S_{n'}$ and $S_{n''}$ respectively, are examined to determine if either set includes only one color. If either set $S_{n'}$ or $S_{n''}$ does include only one color then process 410 proceeds to step 426 and terminates. If both $S_{n'}$ and $S_{n''}$ include more than one color, sub-process 427 will be repeated by incrementing iterative index t by one, at step 424, setting $J''_{old}$ to the value of $J''_{new}$ at step 425, and returning to step 414.

Figure 5:
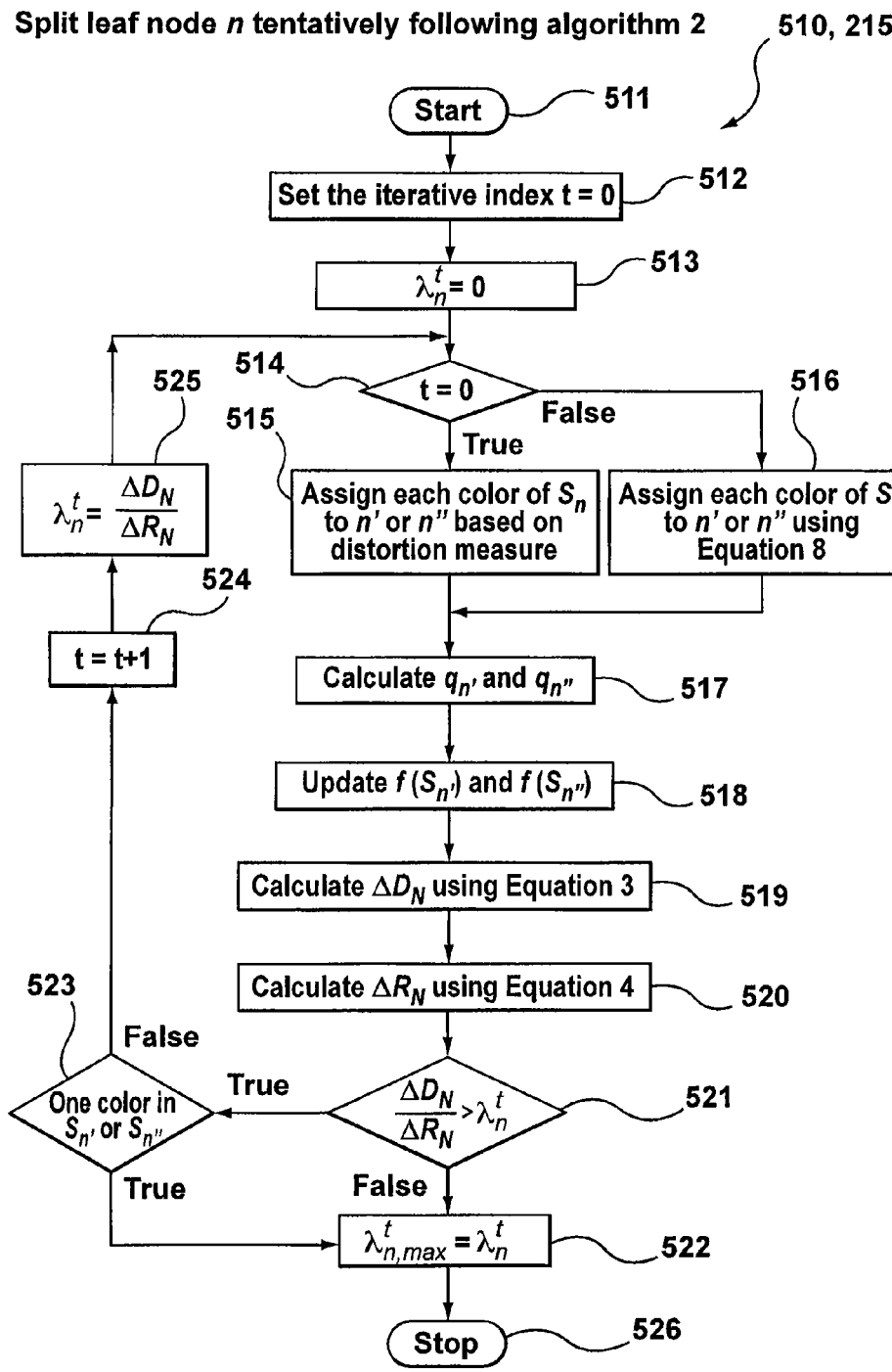
FIG. 5, in a flow chart, illustrates an example of a sub-process of the method of FIG. 2 in which a leaf node is tentatively split.

Referring now to FIG. 5, the process of tentatively splitting a leaf node n according to algorithm 2 will be described. Specifically, process 510 determines the maximum value for a Lagrangian multiplier $\lambda_{n,max}$ if n were split into two new leaf nodes n' and n" and each color in n were assigned to n' or n". The set of colors assigned to a node n is denoted as $S_n$.

Process 510 begins at step 511 and immediately progresses to step 512. At step 512, an iterative index t, used to keep track of the number of iterations of sub-process 527, is initialized to 0. The value of $\lambda_n^t$, representing the dynamically determined Lagrangian multiplier for node n and iteration t of sub-process 527 is initialized to 0 at step 513.

The iterative index t is used at step 514 to determine whether this is the first iteration of sub-process 527 (i.e. t=0). If this is the first iteration of sub-process 527, at step 515, each color in n is assigned to n' or to n" based on a distortion based criterion as described in [2]. In subsequent iterations of sub-process 527, where t≠0, each color in n is assigned to n' or n" based on the biased distortion measure of equation (8) at step 516.

Next, a number of values are calculated based on n' and n". First the new representative colors for n' and n", $q_{n'}$ and $q_{n''}$ are calculated at step 517. At step 518, the number of occurrences in the original image of each color in n' and n", $f(S_{n'})$ and $f(S_{n''})$ respectively, are calculated. At step 519, the reduction in distortion resulting from splitting node n into n' and n", $\Delta D_N$ is calculated using equation (3). At step 520, the increase in entropy rate resulting from splitting node n into n' and n", $\Delta R_N$ is calculated using equation (4).

At step 521, the decrease in distortion, $\Delta D_N$ divided by the increase in entropy rate, $\Delta R_N$, is compared to the Lagrangian multiplier $\lambda_n^t$. If $\Delta D_N/\Delta R_N$ is less than or equal to $\lambda_n^t$ then the maximum achievable Lagrangian multiplier for node n, $\lambda_{n,max}$ is set to $\lambda_n^t$ at step 522 and process 510 proceeds to step 526 and terminates. If $\Delta D_N/\Delta R_N$ is greater than $\lambda_n^t$ then process 510 proceeds to step 523.

At step 523, the sets of colors assigned to n' and n", $S_{n'}$ and $S_{n''}$ respectively, are examined to determine if either set includes only one color. If either set $S_{n'}$ or $S_{n''}$ does include only one color then process 510 proceeds to step 522 where the maximum achievable Lagrangian multiplier for node n, $\lambda_{n,max}$, is set to $\lambda_n^t$ at step 522 and process 510 proceeds to step 526 and terminates. If both $S_{n'}$ and $S_{n''}$ includes more one color, sub-process 527 will be repeated by incrementing iterative index t by one, at step 524, setting $\lambda_n^t$ to be $\Delta D_N/\Delta R_N$ at step 525, and returning to step 514.

Figure 6:
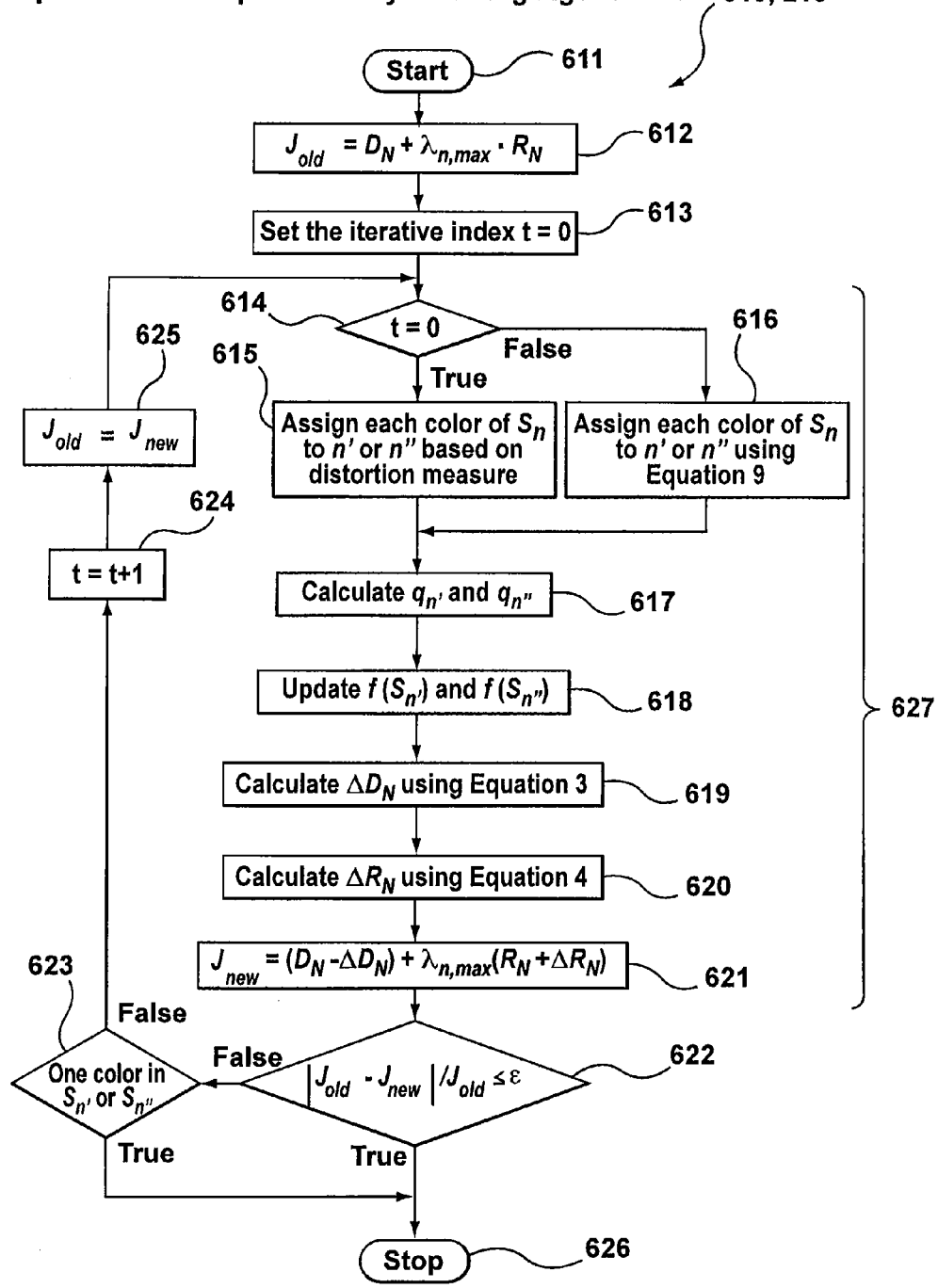
FIG. 6, in a flow chart, illustrates a sub-process of the method of FIG. 2 in which a leaf node is permanently split.

Referring now to FIG. 6, the process of permanently splitting a leaf node n according to algorithm 2 will be described. Specifically, process 610 transforms n into a non-leaf node, creates two new leaf nodes n' and n" and assigns each color in n to either n' or n". The set of colors assigned to a node n is denoted as $S_n$.

Process 610 begins at step 611 and immediately progresses to step 612. At step 612, a cost measurement $J_{old}$ is initialized to the value attained by adding the distortion of the current tree structure, $D_N$, to a product obtained by multiplying the entropy rate of the current tree structure by the Lagrangian multiplier $\lambda_{n,max}$ determined in step 218 of process 210.

At step 613, an iterative index t, used to keep track of the number of iterations of sub-process 627, is initialized to 0. The iterative index t is used at step 614 to determine whether this is the first iteration of sub-process 627 (i.e. t=0). If this is the first iteration of sub-process 627, at step 615, each color in n is assigned to n' or to n" based on a distortion based criterion as described in [2]. In subsequent iterations of sub-process 627, where t≠0, each color in n is assigned to n' or n" based on the biased distortion measure of equation (9) at step 616.

Next, a number of values are calculated based on n' and n". First the new representative colors for n' and n", $q_{n'}$ and $q_{n''}$ are calculated at step 617. At step 618, the number of occurrences in the original image of each color in n' and n", $f(S_{n'})$ and $f(S_{n''})$ respectively, are calculated. At step 619, the reduction in distortion resulting from splitting node n into n' and n", $\Delta D_N$ is calculated using equation (3). At step 620, the increase in entropy rate resulting from splitting node n into n' and n", $\Delta R_N$ is calculated using equation (4). Finally, at step 621, the values of $\Delta D_N$ and $\Delta R_N$ calculated in steps 619 and 620 respectively are used to calculate a cost measure $J_{new}$ representing the cost of the new tree structure.

At step 622, the convergence criterion E, selected in step 317 of process 310, is used to determine whether sub-process 627 should be terminated. If the change in cost resulting from the most recent split, calculated as the difference between $J_{new}$ and $J_{old}$ divided by $J_{old}$, is less than or equal to the convergence criterions then another iteration of sub-process 627 is not required and the process 610 proceeds to step 626 and terminates. Otherwise, process 610 proceeds to step 623.

At step 623, the sets of colors assigned to n' and n", $S_{n'}$ and $S_{n''}$ respectively, are examined to determine if either set includes only one color. If either set $S_{n'}$ or $S_{n''}$ does include only one color then process 610 proceeds to step 626 and terminates. If both $S_{n'}$ and $S_{n''}$ include more than one color, sub-process 627 will be repeated by incrementing iterative index t by one at step 624, setting $J_{old}$ to the value of $J_{new}$ at step 625, and returning to step 614.

Figure 7:
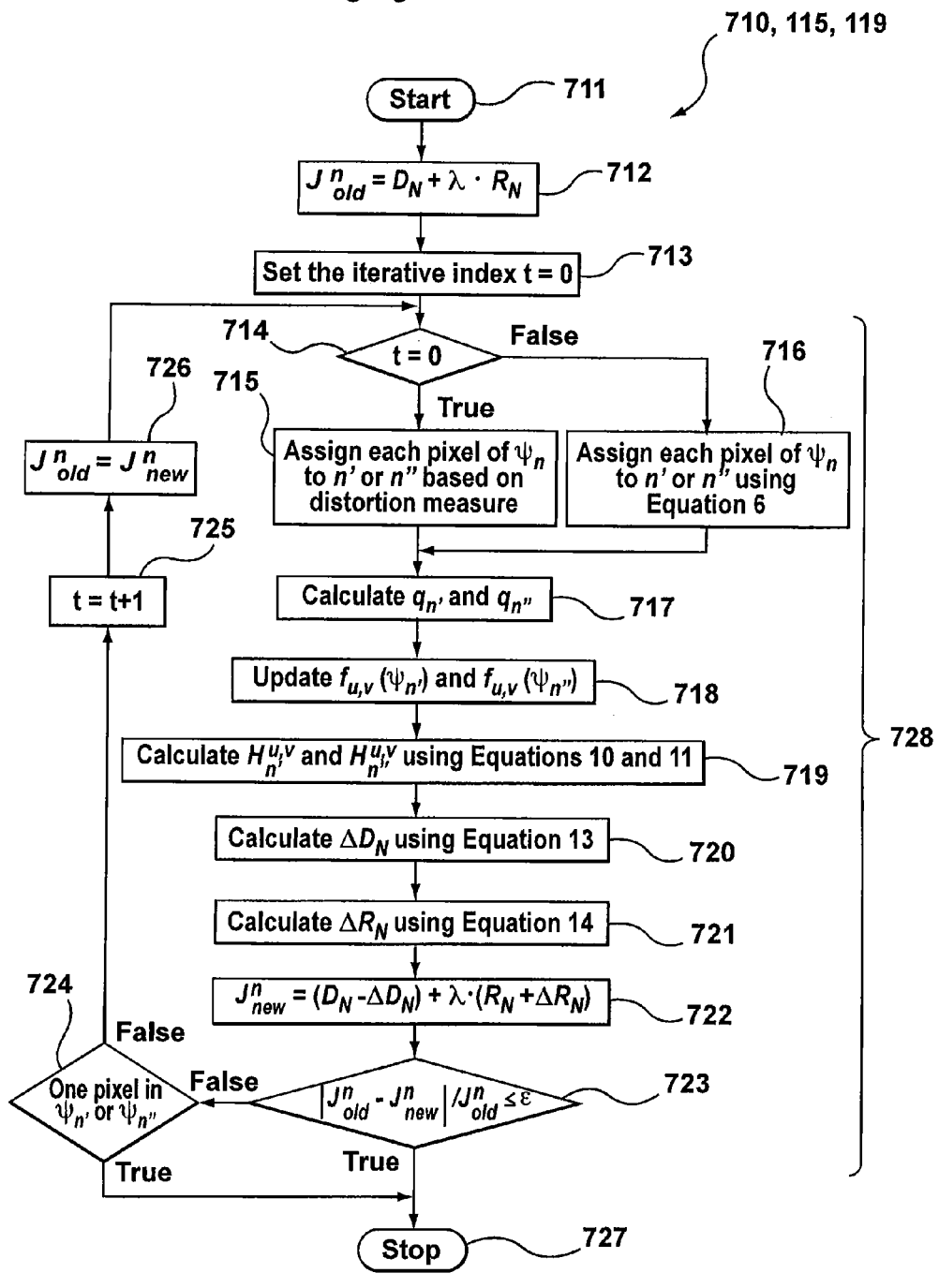
FIG. 7, in a flow chart, illustrates a variant of a sub-process of the method of FIG. 1 for splitting a leaf node.

Referring now to FIG. 7, the process of splitting a leaf node n according to algorithm 3 will be described. In this process, each leaf node n has a corresponding set of pixels, denoted $\Psi_n$. Process 710 transforms n into a non-leaf node, creates two new leaf nodes n' and n" and assigns each pixel in $\Psi_n$ to either n' or n".

Process 710 begins at step 711 and immediately progresses to step 712. At step 712, a cost measurement $J''_{old}$ is initialized to the value attained by adding the distortion of the current tree structure to a product obtained by multiplying the entropy rate of the current tree structure by the Lagrangian multiplier $\lambda$ selected in step 113 of process 110.

At step 713, an iterative index t, used to keep track of the number of iterations of sub-process 728, is initialized to 0. The iterative index t is then used at step 714 to determine whether this is the first iteration of sub-process 728 (i.e. t=0). If this is the first iteration of sub-process 728, at step 715, each pixel in $\Psi_n$ is assigned to n' or to n" based on a distortion based criterion as described in [2]. In subsequent iterations of sub-process 728, where t≠0, each pixel in $\Psi_n$ is assigned to n' or n" based on the biased distortion measure of equation (12) at step 716.

Next, a number of values are calculated based on n' and n". First the new representative colors for n' and n", $q_{n'}$ and $q_{n''}$ are calculated at step 717. At step 718, $f_{u,v}(\Psi_{n'})$ and $f_{u,v}(\Psi_{n''})$ are updated where u and v are the representative color indices of the left and upper neighboring pixels of a pixel p in the current reconstructed image and $f_{u,v}(\Psi_n)$ is the number of pixels mapped to the leaf node n under context u and v. At step 719, $H_{n'}^{u,v}$ and $H_{n''}^{u,v}$, the entropy rates of mapping each $p \in \Psi_n$ to n' or n" under context u and v are calculated using equations (10) and (11) respectively. At step 720, the reduction in distortion resulting from splitting node n into n' and n", $\Delta D_N$, is calculated using equation (13). At step 721, the increase in entropy rate resulting from splitting node n into n' and n", denoted $\Delta R_N$, is calculated using equation (14) which takes into account the entropy values calculated in step 719. Finally, at step 722, the values of $\Delta D_N$ and $\Delta R_N$ calculated in steps 720 and 721 respectively are used to calculate a cost measure $J''_{new}$ representing the cost of the new tree structure.

At step 723, the convergence criterion $\epsilon$, selected in step 317 of process 310, is used to determine whether sub-process 728 should be terminated. If the change in cost resulting from the most recent split, calculated as the difference between $J''_{new}$ and $J''_{old}$ divided by $J''_{old}$, is less than or equal to the convergence criterion $\epsilon$ then another iteration of sub-process 728 is not required and the process 710 proceeds to step 727 and terminates. Otherwise, process 710 proceeds to step 724.

At step 724, the sets of pixels assigned to n' and n", $\Psi_{n'}$ and $\Psi_{n''}$ respectively, are examined to determine if either set includes only one pixel. If either set $\Psi_{n'}$ or $\Psi_{n''}$ does include only one pixel then process 710 proceeds to step 727 and terminates. If both $\Psi_{n'}$ and $\Psi_{n''}$ include more than one pixel, sub-process 728 will be repeated by incrementing iterative index t by one, at step 725, setting $J''_{old}$ to the value of $J''_{new}$ at step 726, and returning to step 714.

Figure 8:
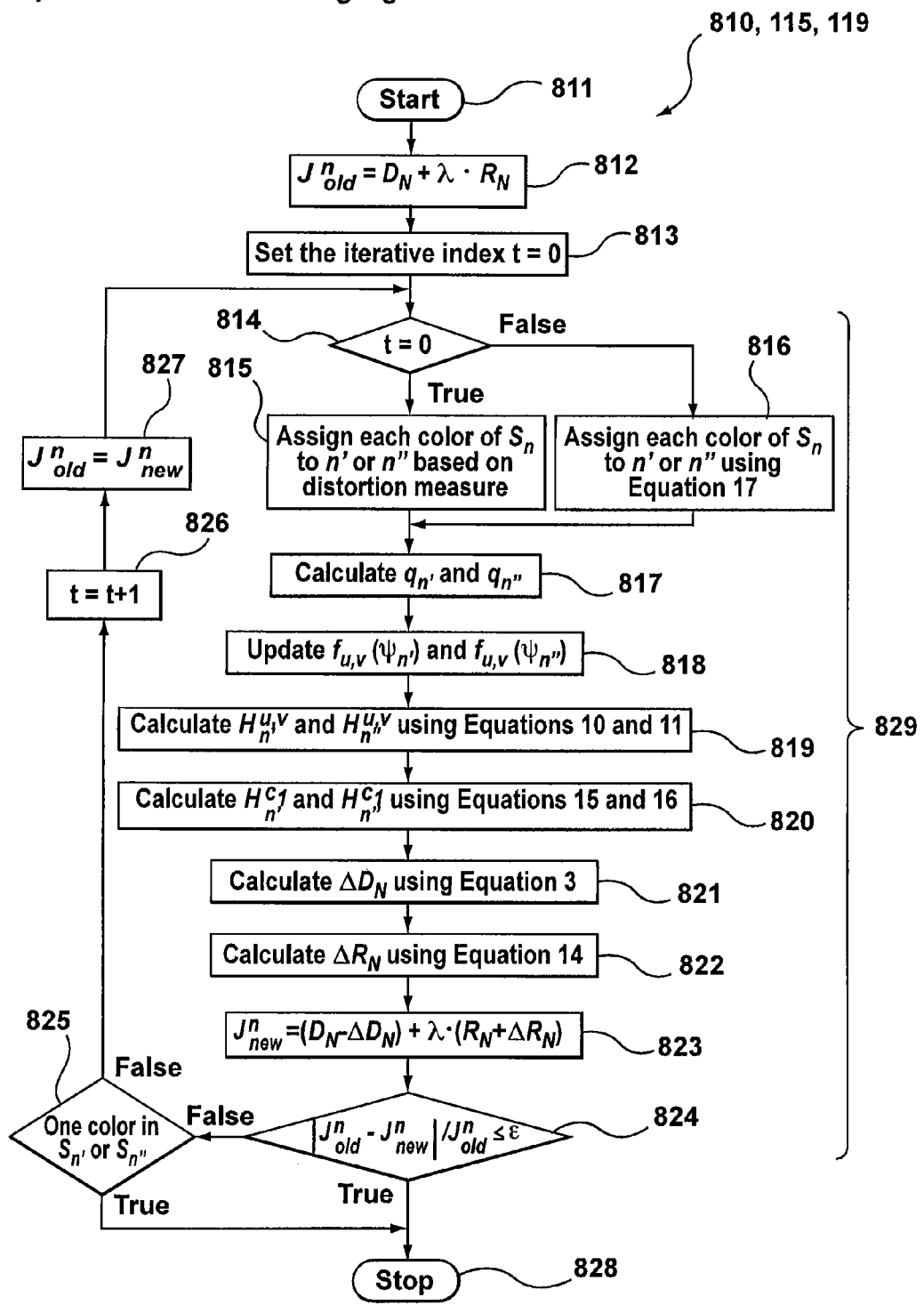
FIG. 8, in a flow chart, illustrates a further variant of splitting a leaf node in the method of FIG. 1.

Referring now to FIG. 8, the process of splitting a leaf node n according to algorithm 4 will be described. In this process, each leaf node n has a corresponding set of pixels, denoted $\Psi_n$ as well as a corresponding set of colors, $S_n$. Process 810 transforms n into a non-leaf node, creates two new leaf nodes n' and n" and assigns each color in n to either n' or n".

Process 810 begins at step 811 and immediately progresses to step 812. At step 812, a cost measurement $J''_{old}$ is initialized to the value attained by adding the distortion of the current tree structure to a product obtained by multiplying the entropy rate of the current tree structure by the Lagrangian multiplier $\lambda$ selected in step 113 of process 110.

At step 813, an iterative index t, used to keep track of the number iterations of sub-process 829, is initialized to 0. The iterative index t is then used at step 814 to determine whether this is the first iteration of sub-process 829 (i.e. t=0). If this is the first iteration of sub-process 829, at step 815, each color in n is assigned to n' or to n" based on a distortion based criterion as described in [2]. In subsequent iterations of sub-process 829, where t≠0, each color in n is assigned to n' or n" based on the biased distortion measure shown in equation (17) at step 816.

Next, a number of values are calculated based on n' and n". First the new representative colors for n' and n", $q_{n'}$ and $q_{n''}$ are calculated at step 817. At step 818, $f_{u,v}(\Psi_{n'})$ and $f_{u,v}(\Psi_{n''})$ are updated where $f_{u,v}(\Psi_n)$ is the number of pixels assigned to node n under context u and v. At step 819, the entropy rates of mapping each $p \in \Psi_n$ to n' or n" under context u and v are calculated using equations (10) and (11) respectively. At step 820, the increase in entropy per pixel resulting from the assignment of $c_i$ to n' where $c_i \in S_n$ is calculated using equation (15) and the same is done for n" using equation (16). At step 821, the reduction in distortion resulting from splitting node n into n' and n", $\Delta D_N$, is calculated using equation (3). At step 822, the increase in entropy rate resulting from splitting node n into n' and n", $\Delta R_N$ is calculated using equation (14) which takes into account the entropy values calculated in step 819. Finally, at step 823, the values of $\Delta D_N$ and $\Delta R_N$ calculated in steps 821 and 822 respectively, are used to calculate a cost measure $J''_{new}$ representing the cost of the new tree structure.

At step 824, the convergence criterion $\epsilon$, selected in step 317 of process 310, is used to determine whether sub-process 829 should be terminated. If the change in cost resulting from the most recent split, calculated as the difference between $J''_{new}$ and $J''_{old}$ divided by $J''_{old}$, is less than or equal to the convergence criterion $\epsilon$ then another iteration of sub-process 829 is not required and the process 810 proceeds to step 828 and terminates. Otherwise, process 810 proceeds to step 825.

At step 825, the sets of colors assigned to n' and n", and $S_{n''}$ respectively, are examined to determine if either set includes only one color. If either set $S_{n'}$ or $S_{n''}$ does include only one color then process 810 proceeds to step 828 and terminates. If both $S_{n'}$ and $S_{n''}$ include more than one color, sub-process 829 will be repeated by incrementing iterative index t by one at step 826, setting $J''_{old}$ to the value of $J''_{new}$ at step 827, and returning to step 814.

Figure 9:
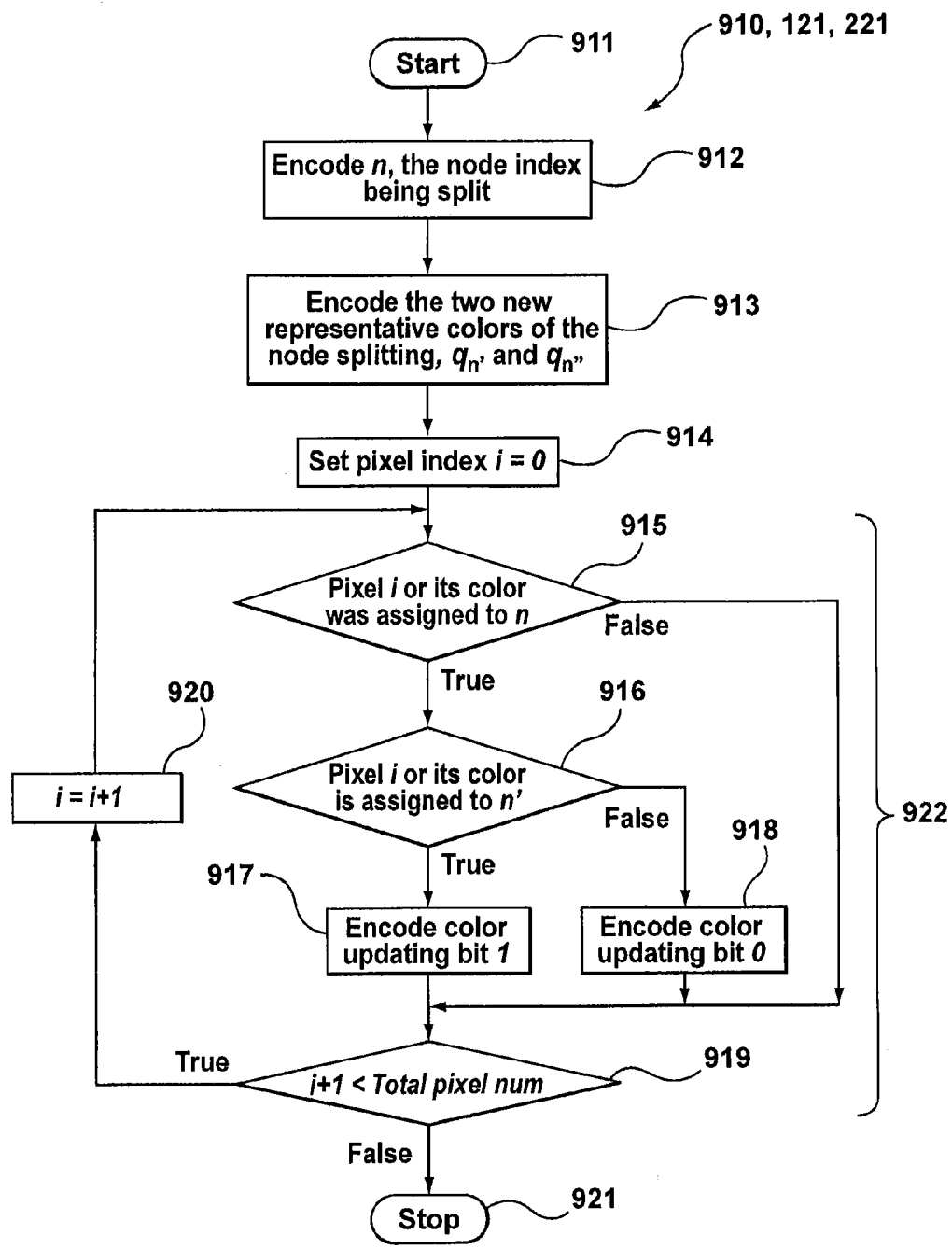
FIG. 9, in a flow chart, illustrates a sub-process of the methods of FIGS. 1 and 2 in which new representative colors are progressively encoded.

Referring now to FIG. 9, the process 910 of progressively encoding the new representative colors and color updating bits will be described.

Process 910 begins at step 911 and immediately proceeds to step 912 where the node index of the node n, which was selected to be split at step 118 of process 110 or at step 218 of process 210, is encoded. At step 913, the representative colors of n' and n", $q_{n'}$ and $q_{n''}$, are encoded.

At step 914, a pixel index i, used to keep track of which pixel is currently being considered by sup-process 922, is initialized to 0. Process 910 then enters the first iteration of sub-process 922.

If pixel i or the color from the original color palette corresponding to pixel i have not been assigned to node n then process 910 proceeds to step 919. If pixel i or the color from the original color palette corresponding to pixel i have been assigned to node n then process 910 proceeds to step 916. At step 916, process 910 determines whether pixel i or the color from the original color palette corresponding to pixel i was assigned to n' or to n" during step 119 of process 110 or step 219 of process 210. If pixel i or the color from the original color palette corresponding to pixel i was assigned to n' then the color updating bit corresponding to pixel i is encoded as 1. Otherwise, pixel i or the color from the original color palette corresponding to pixel i must have been assigned to n" then the color updating bit corresponding to pixel i is encoded as 0.

Process 910 then proceeds to step 919 where it is determined whether all the pixels in the original image have been considered by sub-process 922. If not, the pixel index i is incremented by one in step 920 and process 910 returns to step 915. If all the pixels from the original image have been considered by sub-process 922 then process 910 proceeds to step 921 and terminates.

Once process 910 is completed, the encoded information can be used to update the color of all the pixels assigned to n (in the case of algorithm 3) or all the pixels whose color is assigned to n (in the case of algorithms 1, 2 and 4). If the color updating bit associated with pixel p is 1 then p will be updated to the representative color $q_{n'}$ in the current reconstructed image. If the color updating bit associated with pixel p is 0 then p will be updated to the representative color $q_{n''}$ in the current reconstructed image.

Figure 10:
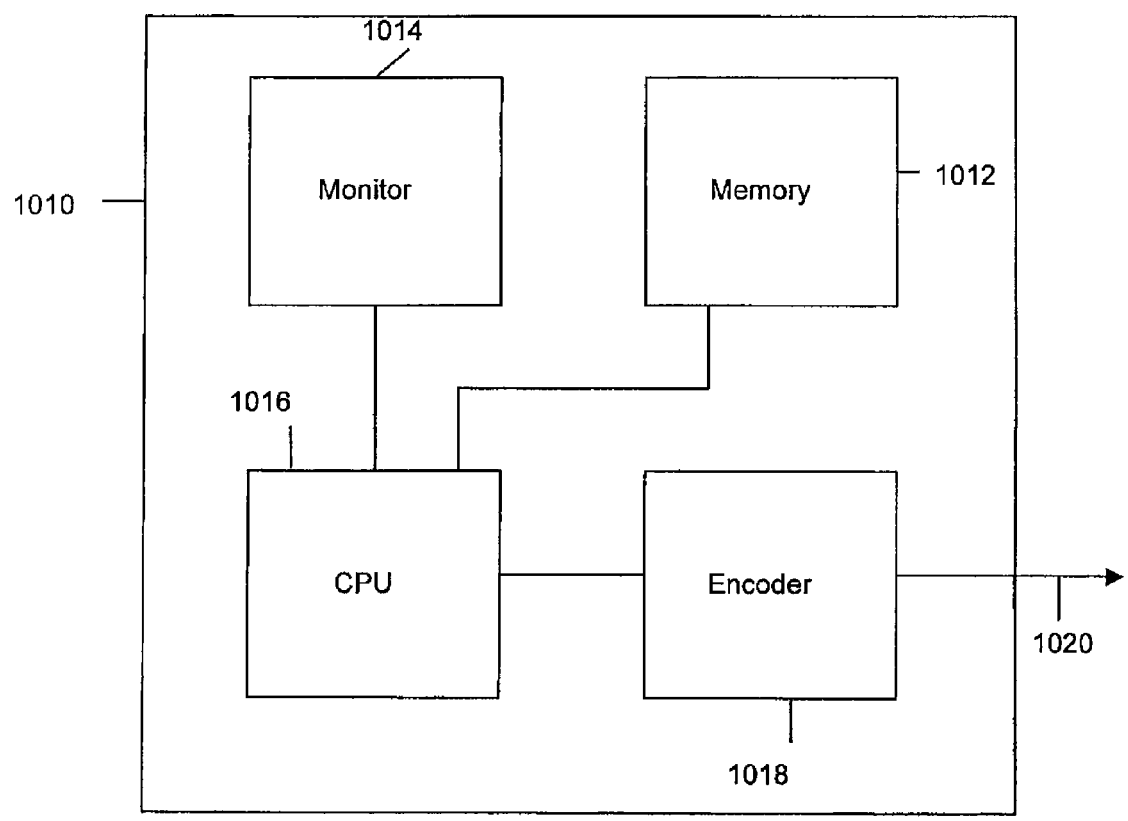
FIG. 10, in a block diagram, illustrates a computer system in accordance with an embodiment of the invention.

Referring to FIG. 10, there is illustrated in a block diagram, a computer system 1010 in accordance with an aspect of an invention. The computer system 1010 comprises a memory 1012 for storing color image data, a monitor 1014 for displaying digital color images, a CPU 1016 for image processing and for providing progressive encoding of color data based on both distortion and entropy rate, and an encoder 1018 for encoding the color image data. After the color image data is encoded, the encoded color image data can be stored, or can be transmitted from the computer system 1010 via transmission conduit 1020.

Figure 11:
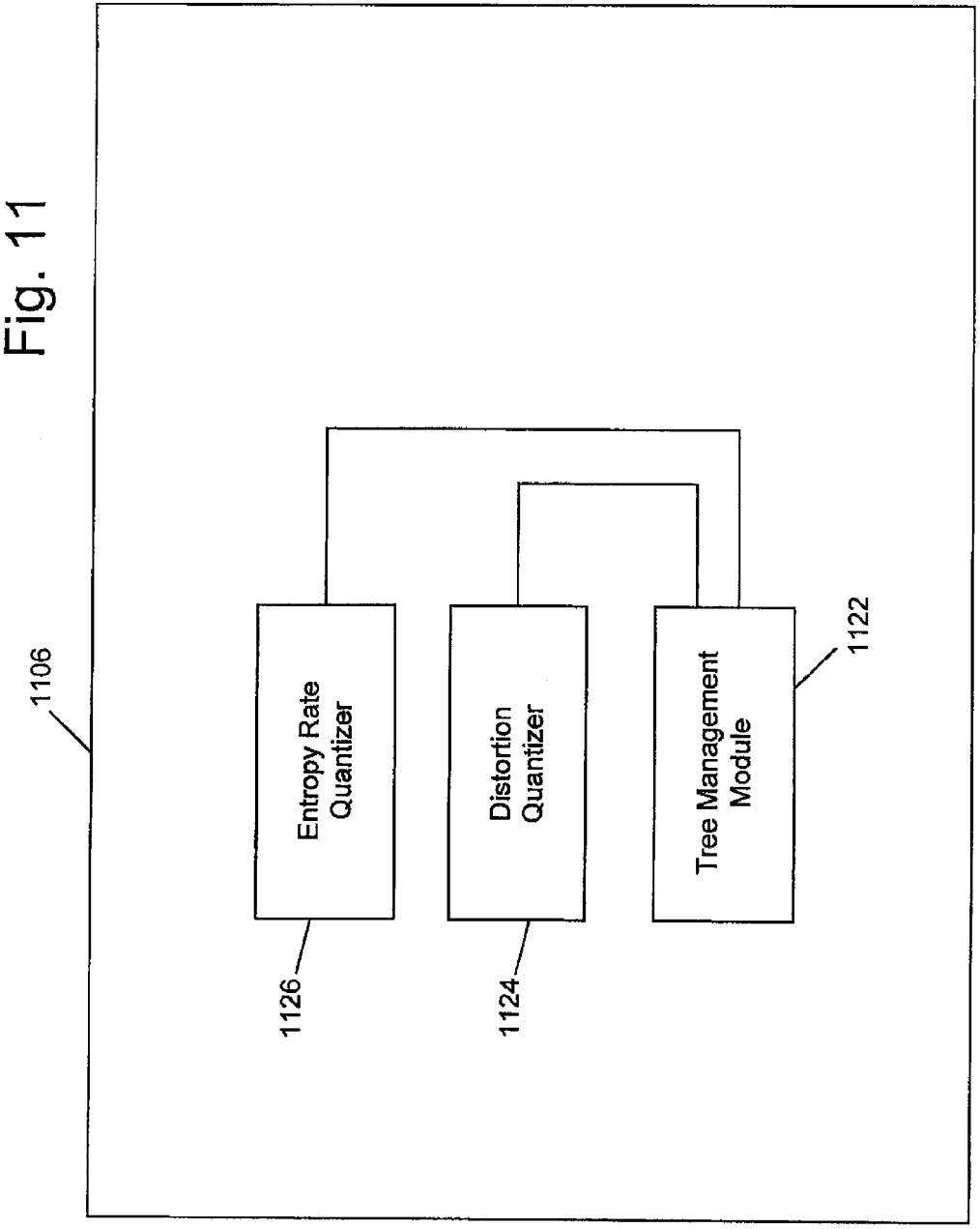
FIG. 11, in a block diagram, illustrates a processor of the computer system of FIG. 10 in more detail.

Referring to FIG. 11, the CPU 1016 of FIG. 10 is illustrated in more detail. Specifically, as shown the CPU 1016 comprises a tree management module 1122, a distortion quantizer 1124 and an entropy rate quantizer 1126. As shown, the tree management module 1122 is linked to both the distortion quantizer 1124 and the entropy rate quantizer 1126.

In operation, the tree management module 1122 is operable to perform operations on a tree structure, such as, for example, both initializing the tree structure by dividing up the colors between the initial starting leaf nodes, which may be just the root node, or, alternatively a plurality of starting leaf and subsequently growing the tree structure. As described above, the process of growing the tree structure is based on both entropy rate and distortion; hence, the tree management module 1122 can be linked to both the entropy rate quantizer 1126 and the distortion quantizer 1124. That is, when selecting a leaf node to be divided to become a non-leaf node linked to two new leaf nodes, the tree management module 1122 can experiment with a particular leaf node by allocating a color in that leaf node to one, or the other, of two new leaf nodes resulting from splitting that original leaf node. Based on both the entropy rate and distortion respectively determined by the entropy rate quantizer 1126 and the distortion quantizer 1124, the tree management module 1122 can determine a particular color allocation between two new leaf nodes of all the colors in the prospective parent node for those two new leaf nodes. By performing this operation over many or all of the leaf nodes, the tree management module 1122 can determine both the particular leaf node to be divided, as well as the color allocation between the two new leaf nodes resulting from this division. The tree management module 1122 can also perform other functions, such as, for example, determining representative colors for new leaf nodes, and maintaining a running count of the total number of leaf nodes.

According to Algorithm 3 described above, the same color in different pixel positions may be assigned to different leaf nodes as leaf node assignment is conducted on a pixel-by-pixel basis, determined both by the context of the particular pixel and color pairs. In implementing Algorithm 3, the operation of entropy rate quantizer 1126 and distortion quantizer 1124 is analogous to that described above. Specifically, whether it is a color or a pixel being allocated to a particular new leaf node in a pair of new leaf nodes, the entropy rate quantizer will determine the marginal increase in entropy rate resulting from this assignment, while the distortion quantizer determines any change in distortion. Of course, as described above, how the change in entropy rate, for example, is determined will be different in Algorithm 3 as this will also depend on how neighboring pixels are assigned between the respective new leaf nodes.

Figure 12A:
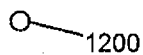
FIGS. 12a-d, in graphs, illustrates the progressive splitting of leaf nodes to provide progressive encoding of colored data in accordance with an aspect of an embodiment of the invention.

Referring to FIGS. 12a-d, the process of progressively splitting leaf nodes to provide progressive encoding of color data is illustrated in a sequence of graphs. In the graph of FIG. 12a, only a root node 1200 is provided. All of the colors in the M distinct colors of the original digitized color image are included in this root node. In the first step of the iterative method described above, the root node 1200 is split into two new leaf nodes 1202 and 1204. With this initial division of the root node 1200, there was, of course, no choice about the particular leaf node to be divided, there being only one node. However, the allocation of all of the M distinct colors in the root node between the new leaf nodes 1202 and 1204 is jointly based on entropy rate and distortion criteria as described above. Specifically, the entropy rate quantizer 1126 can determine a marginal increase in entropy rate for allocating a particular color to either of the new leaf nodes 1202 and 1204. Similarly, the distortion quantizer 1124 can determine a new distortion measure for allocating this color to each of the new leaf nodes 1202 and 1204. An associated biased distortion measure based on both rate and distortion can then be determined for each of the leaf nodes 1202 and 1204, and the color can then be allocated to which ever of leaf nodes 1202 and 1204 has a lower associated biased distortion measure.

Figure 12B:
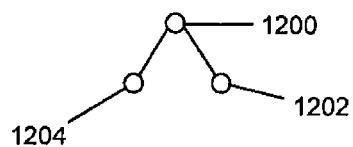
Figure 12C:
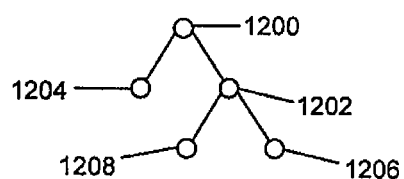

The transition from the graph of FIG. 12b to the graph of FIG. 12c is more complicated as in this instance there are two leaf nodes, leaf node 1202 and leaf node 1204, to choose between dividing. Again, the decision of which of leaf nodes 1202 or 1204 to divide is based on both distortion and entropy rate considerations. According to some embodiments (see Algorithms 1, 3 and 4 described above) of the present invention where a fixed Lagrangian multiplier is employed, a cost for turning that leaf node into a non-leaf node linked to two new leaf nodes (dividing the leaf node) is determined. Then, whichever of the leaf nodes 1202 and 1204 has the lower cost, will be divided. According to another embodiment (see Algorithm 2 described above), the trade-off or Lagrangian multiplier will be determined for each possible leaf node. Then, whichever of the leaf nodes 1202 and 1204 achieves a larger Lagrangian multiplier (i.e., the best trade-off between distortion decrease and entropy rate increase), will be divided.

The cost for dividing each of the leaf nodes 1202 and 1204 is generally determined by the entropy rate quantizer 1126 and the distortion quantizer 1124. That is, the entropy rate quantizer 1126 can determine an associated increase in entropy rate resulting from turning a particular leaf node into a non-leaf node linked to two new leaf nodes, while the distortion quantizer 1124 can determine an associated change in distortion resulting from turning this leaf node into a non-leaf node. Of course, in the case of each leaf node, this will also be an iterative process as different color allocations between the new leaf nodes are tested. Once the associated changes in distortion and entropy rate have been determined for each of the leaf nodes 1202 and 1204, then, in the case where the trade-off between the change in distortion and entropy rate is fixed, the better leaf node to divide can be determined. In the example shown in FIG. 12*c*, leaf node 1202 is divided into two non-leaf nodes 1206 and 1208. At the point in the process of node division represented by FIG. 12*c*, three leaf nodes remain: leaf nodes 1204, 1206 and 1208.

As described above, of course, the Lagrangian multiplier may not be fixed. In that case, a Lagrangian multiplier can be determined for each of the leaf nodes 1202 and 1204 of FIG. 12*b*. Then, the leaf node that has a larger achievable Lagrangian multiplier can be divided.

Figure 12D:
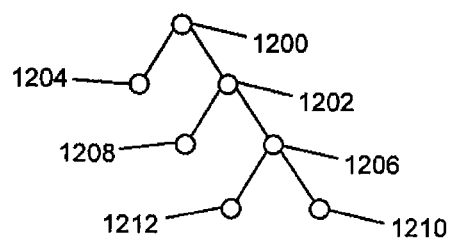

The leaf node division or tree growth in the transition between FIG. 12*c* and FIG. 12*d* is quite similar to that between FIGS. 12*b* and 12*c*. In this latter transition between FIGS. 12*c* and 12*d*, the leaf nodes under consideration for division are leaf nodes 1204, 1206, and 1208. In FIG. 12*d*, leaf node 1206 has been divided to create two new leaf nodes 1210 and 1212. As a result, four leaf nodes 1204, 1208, 1210 and 1212 now exist. This process of leaf node division can continue until some target point is reached. This target point may be based on the total entropy rate or, alternatively, may be based on the total number of leaf nodes resulting from the last division. For example, each time a leaf node is divided, there is an associated increased entropy rate. At some point, the total entropy rate associated with the binary tree may exceed a target entropy rate. Also, each time a leaf node is divided, the total number of leaf nodes is increased by one. At some point, the new total number of leaf nodes in the tree structure may exceed some target number of leaf nodes. This target number of leaf nodes may be M (the number of colors in the original digitized color image) such that the original digitized color image can be completely reproduced for color-wise splitting algorithm (i.e., Algorithms 1, 2 and 4). Alternatively, this target number of leaf nodes may be less than M. In some embodiments, the process of tree growth or leaf node division will cease when either the associated total entropy rate exceeds the target entropy rate or the total number of leaf nodes exceeds the target number of leaf nodes.

In accordance with an aspect of an embodiment of the invention, a mobile wireless communication device can be used to provide entropy-constrained color splitting as described above. The embodiments described below generally relate to such a mobile wireless communication device, hereafter referred to as a mobile device, which can be configured according to an IT policy. It should be noted that the term IT policy, in general, refers to a collection of IT policy rules, in which the IT policy rules can be defined as being either grouped or non-grouped and global or per-user. The terms grouped, non-grouped, global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 13 and 14.

Figure 13:
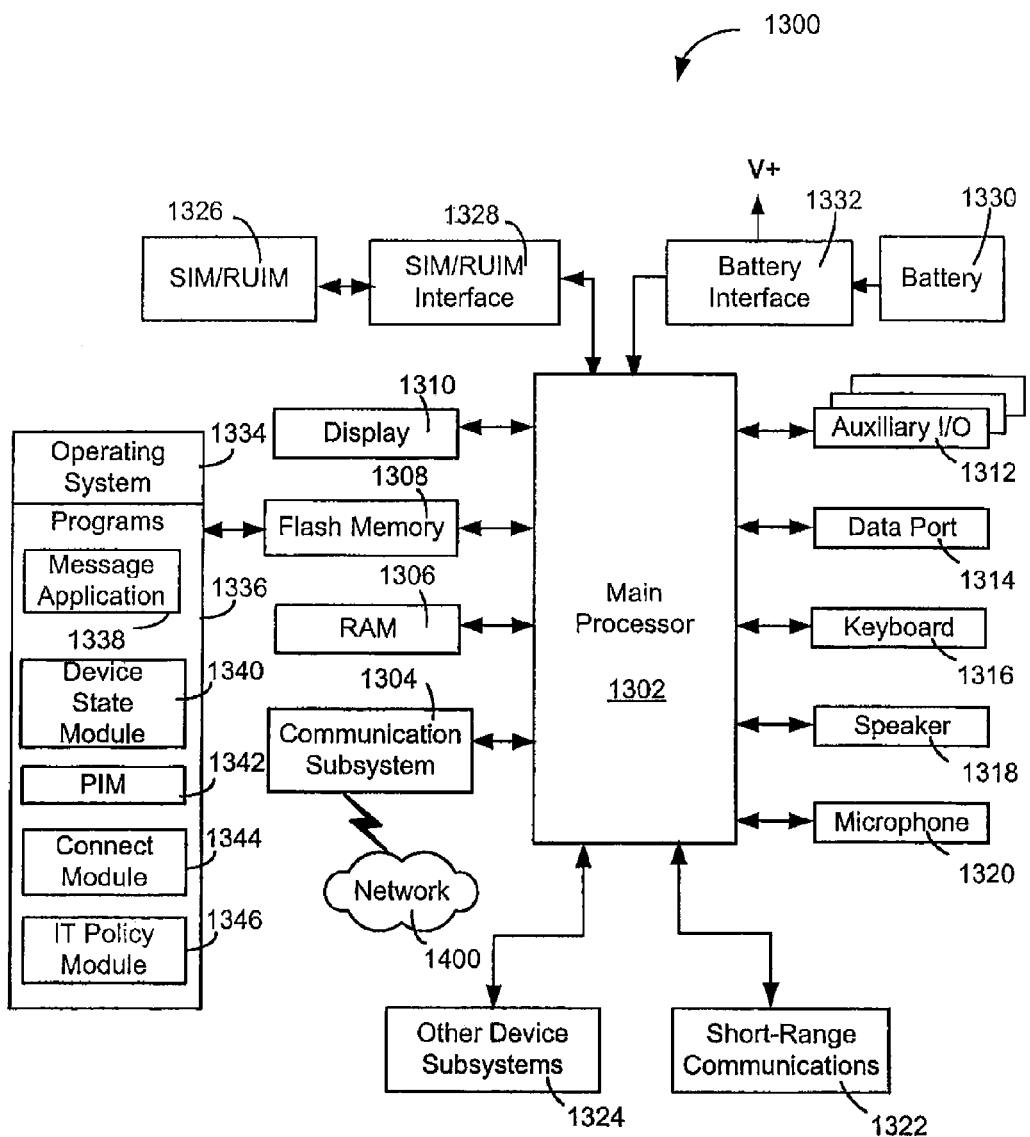
FIG. 13 is a block diagram of an exemplary embodiment of a mobile device.

Referring first to FIG. 13, shown therein is a block diagram of an exemplary embodiment of a mobile device 1300. The mobile device 1300 includes a number of components such as a main processor 1302 that controls the overall operation of the mobile device 1300. Communication functions, including data and voice communications, are performed through a communication subsystem 1304. The communication subsystem 1304 receives messages from and sends messages to a wireless network 1400. In this exemplary embodiment of the mobile device 1300, the communication subsystem 1304 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 1304 with the wireless network 1400 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1400 associated with mobile device 1300 is a GSM/GPRS wireless network in one exemplary implementation, other wireless networks may also be associated with the mobile device 1300 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 1302 also interacts with additional subsystems such as a Random Access Memory (RAM) 1306, a flash memory 1308, a display 1310, an auxiliary input/output (I/O) subsystem 1312, a data port 1314, a keyboard 1316, a speaker 1318, a microphone 1320, short-range communications 1322 and other device subsystems 1324.

Some of the subsystems of the mobile device 1300 perform communication-related functions, whereas other subsystems may provide "resident" or on-device functions. By way of example, the display 1310 and the keyboard 1316 may be used for both communication-related functions, such as entering a text message for transmission over the network 1400, and device-resident functions such as a calculator or task list.

The mobile device 1300 can send and receive communication signals over the wireless network 1400 after required network registration or activation procedures have been completed. Network access is associated with a subscriber or user of the mobile device 1300. To identify a subscriber, the mobile device 1300 requires a SIM/RUIM card 1326 (i.e. Subscriber Identity Module or a Removable User Identity Module) to be inserted into a SIM/RUIM interface 1328 in order to communicate with a network. The SIM card or RUIM 1326 is one type of a conventional "smart card" that can be used to identify a subscriber of the mobile device 1300 and to personalize the mobile device 1300, among other things. Without the SIM card 1326, the mobile device 1300 is not fully operational for communication with the wireless network 1400. By inserting the SIM card/RUIM 1326 into the SIM/RUIM interface 1328, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 1326 includes a processor and memory for storing information. Once the SIM card/RUIM 1326 is inserted into the SIM/RUIM interface 1328, it is coupled to the main processor 1302. In order to identify the subscriber, the SIM card/RUIM 1326 can include some user parameters such as an International Mobile Subscriber Identity (IMSI). An advantage of using the SIM card/RUIM 1326 is that a subscriber is not necessarily bound by any single physical mobile device. The SIM card/RUIM 1326 may store additional subscriber information for a mobile device as well, including datebook (or calendar) information and recent call information. Alternatively, user identification information can also be programmed into the flash memory 1308.

The mobile device 1300 is a battery-powered device and includes a battery interface 1332 for receiving one or more rechargeable batteries 1330. In at least some embodiments, the battery 1330 can be a smart battery with an embedded microprocessor. The battery interface 1332 is coupled to a regulator (not shown), which assists the battery 1330 in providing power V+ to the mobile device 1300. Although current technology makes use of a battery, future technologies such as micro fuel cells may provide the power to the mobile device 1300.

The mobile device 1300 also includes an operating system 1334 and software components 1336 to 1346 which are described in more detail below. The operating system 1334 and the software components 1336 to 1346 that are executed by the main processor 1302 are typically stored in a persistent store such as the flash memory 1308, which may alternatively be a read-only memory (ROM) or similar storage element (not shown). Those skilled in the art will appreciate that portions of the operating system 1334 and the software components 1336 to 1346, such as specific device applications, or parts thereof, may be temporarily loaded into a volatile store such as the RAM 1306. Other software components can also be included, as is well known to those skilled in the art.

The subset of software applications 1336 that control basic device operations, including data and voice communication applications, will normally be installed on the mobile device 1300 during its manufacture. Other software applications include a message application 1338 that can be any suitable software program that allows a user of the mobile device 1300 to send and receive electronic messages. Various alternatives exist for the message application 1338 as is well known to those skilled in the art. Messages that have been sent or received by the user are typically stored in the flash memory 1308 of the mobile device 1300 or some other suitable storage element in the mobile device 1300. In at least some embodiments, some of the sent and received messages may be stored remotely from the device 1300 such as in a data store of an associated host system that the mobile device 1300 communicates with.

The software applications can further include a device state module 1340, a Personal Information Manager (PIM) 1342, and other suitable modules (not shown). The device state module 1340 provides persistence, i.e. the device state module 1340 ensures that important device data is stored in persistent memory, such as the flash memory 1308, so that the data is not lost when the mobile device 1300 is turned off or loses power.

The PIM 1342 includes functionality for organizing and managing data items of interest to the user, such as, but not limited to, e-mail, contacts, calendar events, voice mails, appointments, and task items. A PIM application has the ability to send and receive data items via the wireless network 1400. PIM data items may be seamlessly integrated, synchronized, and updated via the wireless network 1400 with the mobile device subscriber's corresponding data items stored and/or associated with a host computer system. This functionality creates a mirrored host computer on the mobile device 1300 with respect to such items. This can be particularly advantageous when the host computer system is the mobile device subscriber's office computer system.

The mobile device 1300 also includes a connect module 1344, and an IT policy module 1346. The connect module 1344 implements the communication protocols that are required for the mobile device 1300 to communicate with the wireless infrastructure and any host system, such as an enterprise system, that the mobile device 1300 is authorized to interface with.

The connect module 1344 includes a set of APIs that can be integrated with the mobile device 1300 to allow the mobile device 1300 to use any number of services associated with the enterprise system. The connect module 1344 allows the mobile device 1300 to establish an end-to-end secure, authenticated communication pipe with the host system. A subset of applications for which access is provided by the connect module 1344 can be used to pass IT policy commands from the host system to the mobile device 1300. This can be done in a wireless or wired manner. These instructions can then be passed to the IT policy module 1346 to modify the configuration of the device 1300. Alternatively, in some cases, the IT policy update can also be done over a wired connection.

The IT policy module 1346 receives IT policy data that encodes the IT policy. The IT policy module 1346 then ensures that the IT policy data is authenticated by the mobile device 1300. The IT policy data can then be stored in the flash memory 1306 in its native form. After the IT policy data is stored, a global notification can be sent by the IT policy module 1346 to all of the applications residing on the mobile device 1300. Applications for which the IT policy may be applicable then respond by reading the IT policy data to look for IT policy rules that are applicable.

The IT policy module 1346 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 1346 can determine which applications are affected by the IT policy data and send a notification to only those applications. In either of these cases, for applications that aren't running at the time of the notification, the applications can call the parser or the IT policy module 1346 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 1346 sends an acknowledgement back to the host system to indicate that the IT policy data was received and successfully applied.

Other types of software applications can also be installed on the mobile device 1300. These software applications can be third party applications, which are added after the manufacture of the mobile device 1300. Examples of third party applications include games, calculators, utilities, etc.

The additional applications can be loaded onto the mobile device 1300 through at least one of the wireless network 1400, the auxiliary I/O subsystem 1312, the data port 1314, the short-range communications subsystem 1322, or any other suitable device subsystem 1324. This flexibility in application installation increases the functionality of the mobile device 1300 and may provide enhanced on-device functions, communication-related functions, or both. For example, secure communication applications may enable electronic commerce functions and other such financial transactions to be performed using the mobile device 1300.

The data port 1314 enables a subscriber to set preferences through an external device or software application and extends the capabilities of the mobile device 1300 by providing for information or software downloads to the mobile device 1300 other than through a wireless communication network. The alternate download path may, for example, be used to load an encryption key onto the mobile device 1300 through a direct and thus reliable and trusted connection to provide secure device communication.

The data port 1314 can be any suitable port that enables data communication between the mobile device 1300 and another computing device. The data port 1314 can be a serial or a parallel port. In some instances, the data port 1314 can be a USB port that includes data lines for data transfer and a supply line that can provide a charging current to charge the battery 1330 of the mobile device 1300.

The short-range communications subsystem 1322 provides for communication between the mobile device 1300 and different systems or devices, without the use of the wireless network 1400. For example, the subsystem 1322 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 1304 and input to the main processor 1302. The main processor 1302 will then process the received signal for output to the display 1310 or alternatively to the auxiliary I/O subsystem 1312. A subscriber may also compose data items, such as e-mail messages, for example, using the keyboard 1316 in conjunction with the display 1310 and possibly the auxiliary I/O subsystem 1312. The auxiliary subsystem 1312 may include devices such as: a touch screen, mouse, track ball, infrared fingerprint detector, or a roller wheel with dynamic button pressing capability. The keyboard 1316 is preferably an alphanumeric keyboard and/or telephone-type keypad. However, other types of keyboards may also be used. A composed item may be transmitted over the wireless network 1400 through the communication subsystem 1304.

For voice communications, the overall operation of the mobile device 1300 is substantially similar, except that the received signals are output to the speaker 1318, and signals for transmission are generated by the microphone 1320. Alternative voice or audio I/O subsystems, such as a voice message recording subsystem, can also be implemented on the mobile device 1300. Although voice or audio signal output is accomplished primarily through the speaker 1318, the display 1310 can also be used to provide additional information such as the identity of a calling party, duration of a voice call, or other voice call related information.

Figure 14:
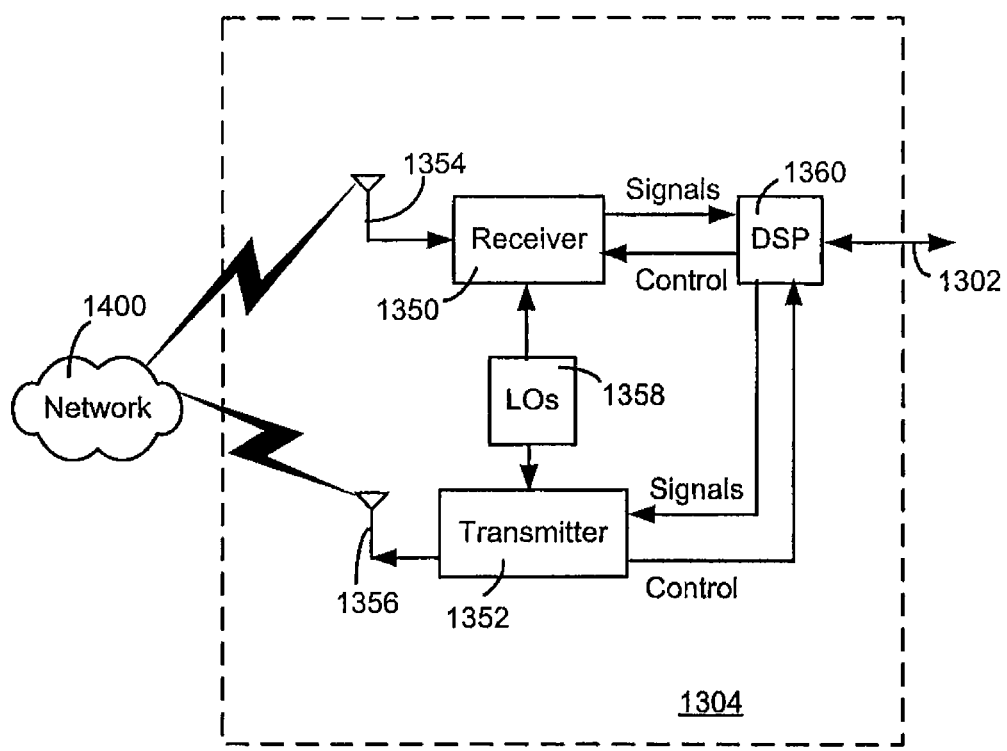
FIG. 14 is a block diagram of an exemplary embodiment of a communication subsystem component of the mobile device of FIG. 13.

Referring now to FIG. 14, an exemplary block diagram of the communication subsystem component 1304 is shown. The communication subsystem 1304 includes a receiver 1350, a transmitter 1352, as well as associated components such as one or more embedded or internal antenna elements 1354 and 1356, Local Oscillators (LOs) 1358, and a processing module such as a Digital Signal Processor (DSP) 1360. The particular design of the communication subsystem 1304 is dependent upon the communication network 1400 with which the mobile device 1300 is intended to operate. Thus, it should be understood that the design illustrated in FIG. 14 serves only as one example.

Signals received by the antenna 1354 through the wireless network 1400 are input to the receiver 1350, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 1360. In a similar manner, signals to be transmitted are processed, including modulation and encoding, by the DSP 1360. These DSP-processed signals are input to the transmitter 1352 for digital-to-analog (D/A) conversion, frequency up conversion, filtering, amplification and transmission over the wireless network 1400 via the antenna 1356. The DSP 1360 not only processes communication signals, but also provides for receiver and transmitter control. For example, the gains applied to communication signals in the receiver 1350 and the transmitter 1352 may be adaptively controlled through automatic gain control algorithms implemented in the DSP 1360.

The wireless link between the mobile device 1300 and the wireless network 1400 can contain one or more different channels, typically different RF channels, and associated protocols used between the mobile device 1300 and the wireless network 1400. An RF channel is a limited resource that must be conserved, typically due to limits in overall bandwidth and limited battery power of the mobile device 1300.

When the mobile device 1300 is fully operational, the transmitter 1352 is typically keyed or turned on only when it is transmitting to the wireless network 1400 and is otherwise turned off to conserve resources. Similarly, the receiver 1350 is periodically turned off to conserve power until it is needed to receive signals or information (if at all) during designated time periods.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

Other variations and modifications of the invention are possible. For example, it will be appreciated by those of skill in the art that aspects of embodiments of the present invention can also be embodied in instructions stored on a suitable recording medium, which instructions could subsequently be used to configure a computer system to implement an embodiment of the present invention. All such modifications or variations are believed to be within the sphere and scope of the invention as defined by the claims appended hereto.

The invention claimed is:

1. A method for progressively encoding a digitized color image with M distinct colors allocated to a set of pixels using a data processing system, the digitized color image being provided by assigning each of the M distinct colors to an associated subset of pixels in the set of pixels, the method comprising:
   (a) initializing a tree structure by providing at least one starting leaf node comprising a set of colors from the M distinct colors;
   (b) determining at least one representative color for each starting leaf node; and
   (c) growing the tree structure and updating an encoded image by repeatedly
      (i) selecting a leaf node n to become a non-leaf node n linked to two new leaf nodes based on an associated achievable cost, wherein the associated achievable cost is determined by
      determining an associated change in distortion resulting from turning the leaf node into the non-leaf node linked to the two new leaf nodes;
      determining an associated increase in entropy rate resulting from turning the leaf node into the non-leaf node linked to the two new leaf nodes; and,
      determining the associated achievable cost based on the associated change in distortion and the associated increase in entropy rate;
      (ii) creating the two new leaf nodes by allocating each color in leaf node n to one of the two new leaf nodes;
      (iii) determining a representative color for each of the two new leaf nodes; and
      (iv) encoding index information associated with the selected leaf node n, the representative colors of the two new leaf nodes, and color updating bits regarding a plurality of pixels of the digitized color image corresponding to the two representative colors of the two new leaf nodes.

2. The method as defined in claim 1 wherein (c)(i) comprises,
   (A) for each leaf node in the tree structure, determining an achievable cost for that leaf node by tentatively splitting that leaf node by
      (i) for each color allocated to that leaf node, tentatively allocating that color to one of two new tentative leaf nodes n' and n" based on:
   determining a color quantization error resulting from representing that color with a tentative representative color determined for the one of two new tentative leaf nodes n' and n" to which that color is being tentatively allocated, and determining an increase in entropy per pixel resulting from representing each pixel in the subset of pixels having that color initially assigned thereto with the tentative representative color determined for the one of two new tentative leaf nodes n' and n" to which that color is being tentatively allocated,
   wherein the determined increase in entropy per pixel is determined based on a context, in the encoded image as currently encoded, of each pixel in the subset of pixels having that color initially assigned thereto;
   wherein the context for that pixel comprises a set of neighboring pixels in the encoded image as currently encoded;
      (ii) determining a tentative change in distortion for that leaf node based on, for each color allocated to that leaf node, the color quantization error for that color and a tentative increase in entropy rate for that leaf node based on, for each color allocated to that leaf node, and for the context, in the encoded image as currently encoded, of each pixel in the subset of pixels having that color initially assigned thereto, an increase in entropy under that context; and
      (iii) determining the achievable cost for that leaf node based on the tentative change in distortion for that leaf node and the tentative increase in entropy rate for that leaf node; and
   (B) selecting a leaf node n to be split into two new leaf nodes n' and n" based on the achievable cost determined for each leaf node in the tree structure.

3. The method as defined in claim 2 wherein (A) further comprises, for each leaf node in the tree structure, iteratively repeating (A)(i), (A)(ii) and (A)(iii), and wherein, for each color, the determined increase in entropy per pixel is further based on, for each pixel in the subset of pixels having that color initially assigned thereto, a number of pixels tentatively allocated to tentative leaf node n' under the context for that pixel and a number of pixels tentatively allocated to tentative leaf node n" under the context for that pixel during an immediately prior iteration of (A)(i) for that leaf node.

4. The method as defined in claim 1 wherein the at least one starting leaf node is a root node of the tree structure and the set of colors in the root node includes all M distinct colors.

5. The method as defined in claim 1 wherein the at least one starting leaf node comprises a plurality of starting leaf nodes containing a plurality of disjoint subsets of the M distinct colors, wherein each disjoint subset of colors is included in one and only one starting leaf node in the plurality of starting nodes.

6. The method as defined in claim 1 wherein (c) further comprises
   determining at least one of A) an associated increased entropy rate resulting from turning the leaf node n into the non-leaf node n linked to the two new leaf nodes by allocating each color in leaf node n to one of the two new leaf nodes and, B) a new total number of leaf nodes resulting from turning the leaf node n into the non-leaf node n linked to the two new leaf nodes;

if the associated increased entropy rate is determined, then repeating (c) if the associated increased entropy rate is less than a target entropy rate; and if the new total number of leaf nodes is determined, then repeating (c) if the new total number of leaf nodes is less than a target number of leaf nodes.

7. The method as defined in claim 1 wherein determining a representative color for a leaf node comprises for each color in the leaf node, determining a number of pixels in the associated subset of pixels having that color in the digitized color image; and, determining a centroid of all of the colors in the leaf node based on all of the colors in the leaf node and the number of pixels in the subset of pixels associated with each of the colors in the leaf node.

8. The method as defined in claim 1 wherein (c)(ii) comprises allocating each color in leaf node n to one of the two new leaf nodes by determining, for each of the two new leaf nodes, an associated biased distortion measure involving both rate and distortion for allocating the color to that new leaf node, and allocating the color in leaf node n to the new leaf node having a lower associated biased distortion measure.

9. The method as defined in claim 8 wherein, for each of the two new leaf nodes, the associated biased distortion measure is determined by determining an associated change in distortion resulting from allocating the color to the new leaf node;

determining an associated increase in entropy rate resulting from allocating the color to the new leaf node; and, calculating the associated biased distortion measure based on the associated change in distortion and the associated increase in entropy rate.

10. The method as defined in claim 9 wherein, for each of the two new leaf nodes, determining an associated increase in entropy rate resulting from allocating that color to the new leaf node comprises, determining, for each pixel in the subset of pixels for that color, a set of neighboring pixels, wherein each pixel in the set of neighboring pixels borders the pixel;

determining an entropy rate increase for the pixel based on the set of neighboring pixels; and determining an associated increase in entropy rate resulting from allocating that color to the new leaf node based on entropy rate increases of all pixels in the subset of pixels for that color.

11. The method as defined in claim 1 further comprising initializing an image with fewer than M colors based on the at least one representative color for each starting node;

where (c)(iv) further comprises determining color updating information bits for a plurality of pixels of the digitized color image corresponding to the two representative colors of the two new leaf nodes according to allocation of colors in leaf node n to one of the two new leaf nodes in (c)(ii); and encoding the color updating information bits based on the image with fewer than M colors by using arithmetic coding.

12. The method as defined in claim 1 wherein (c)(i) comprises, for each leaf node, determining the associated achievable cost for turning the leaf node into a non-leaf node linked to two new leaf nodes; and, selecting the leaf node based on comparing the associated achievable cost for that leaf node with the associated achievable cost for at least one other leaf node.

13. The method as defined in claim 12 wherein (c)(i) comprises, for each leaf node, determining if the associated achievable cost for the selected leaf node is lower than the associated achievable cost for each of the other leaf nodes.

14. The method as defined in claim 13 wherein (c)(i) comprises, for each leaf node, determining the associated achievable cost based on adding the associated change in distortion to a product obtained by multiplying the associated increase in the entropy rate by a multiplier.

15. The method as defined in claim 14 where the multiplier is a fixed Lagrangian multiplier.

16. The method as defined in claim 13 wherein (c)(i) comprises, for each leaf node, determining the associated achievable cost by determining an associated achievable tradeoff between the associated increase in entropy rate and the associated reduction in distortion resulting from turning the leaf node into the non-leaf node linked to the two new leaf nodes; and, determining the associated achievable cost based on the associated achievable tradeoff, the associated increase in entropy rate and the associated reduction in distortion.

17. The method as defined in claim 1 further comprising initializing an encoded image based on the at least one representative color for each starting node;

wherein (c) further comprises progressively updating the encoded image by appending the encoded bits obtained in (c)(iv).

18. A computer program product for use on a computer system comprising a non-transitory computer-readable medium comprising instructions that, when executed by a processor of the computer system, cause the processor to perform acts of a method to progressively encode a digitized color image with M distinct colors allocated to a set of pixels, the digitized color image being provided by assigning each of the M distinct colors to an associated subset of pixels in the set of pixels, the acts comprising:

(a) initializing a tree structure by providing at least one starting leaf node comprising a set of colors from the M distinct colors;

(b) determining at least one representative color for each starting leaf node; and (c) growing the tree structure and updating an encoded image by repeatedly (i) selecting a leaf node n to become a non-leaf node n linked to two new leaf nodes based on an associated achievable cost, wherein the associated achievable cost is determined by determining an associated change in distortion resulting from turning the leaf node into the non-leaf node linked to the two new leaf nodes;

determining an associated increase in entropy rate resulting from turning the leaf node into the non-leaf node linked to the two new leaf nodes; and, determining the associated achievable cost based on the associated change in distortion and the associated increase in entropy rate;

(ii) creating the two new leaf nodes by allocating each color in leaf node n to one of the two new leaf nodes;

(iii) determining a representative color for each of the two new leaf nodes; and (iv) encoding index information associated with the selected leaf node n, the representative colors of the two new leaf nodes, and color updating bits regarding a plurality of pixels of the digitized color image corresponding to the two representative colors of the two new leaf nodes.

19. The computer program product as defined in claim 18 wherein (c)(i) comprises,
   (A) for each leaf node in the tree structure, determining an achievable cost for that leaf node by tentatively splitting that leaf node by
      (i) for each color allocated to that leaf node, tentatively allocating that color to one of two new tentative leaf nodes n' and n" based on:
         determining a color quantization error resulting from representing that color with a tentative representative color determined for the one of two new tentative leaf nodes n' and n" to which that color is being tentatively allocated, and determining an increase in entropy per pixel resulting from representing each pixel in the subset of pixels having that color initially assigned thereto with the tentative representative color determined for the one of two new tentative leaf nodes n' and n" to which that color is being tentatively allocated,
         wherein the determined increase in entropy per pixel is determined based on a context, in the encoded image as currently encoded, of each pixel in the subset of pixels having that color initially assigned thereto;
         wherein the context for that pixel comprises a set of neighboring pixels in the encoded image as currently encoded;
      (ii) determining a tentative change in distortion for that leaf node based on, for each color allocated to that leaf node, the color quantization error for that color and a tentative increase in entropy rate for that leaf node based on, for each color allocated to that leaf node, and for the context, in the encoded image as currently encoded, of each pixel in the subset of pixels having that color initially assigned thereto, an increase in entropy under that context; and
      (iii) determining the achievable cost for that leaf node based on the tentative change in distortion for that leaf node and the tentative increase in entropy rate for that leaf node; and
   (B) selecting a leaf node n to be split into two new leaf nodes n' and n" based on the achievable cost determined for each leaf node in the tree structure.

20. The computer program product as defined in claim 19 wherein (A) further comprises, for each leaf node in the tree structure, iteratively repeating (A)(i), (A)(ii) and (A)(iii), and wherein, for each color, the determined increase in entropy per pixel is further based on, for each pixel in the subset of pixels having that color initially assigned thereto, a number of pixels tentatively allocated to tentative leaf node n' under the context for that pixel and a number of pixels tentatively allocated to tentative leaf node n" under the context for that pixel during an immediately prior iteration of (A)(i) for that leaf node.

21. The computer program product as defined in claim 18 wherein the at least one starting leaf node is a root node of the tree structure and the set of colors in the root node includes all M distinct colors.

22. The computer program product as defined in claim 18 wherein the at least one starting leaf node comprises a plurality of starting leaf nodes containing a plurality of disjoint subsets of the M distinct colors, wherein each disjoint subset of colors is included in one and only one starting leaf node in the plurality of starting nodes.

23. The computer program product as defined in claim 18 wherein (c) further comprises determining at least one of A) an associated increased entropy rate resulting from turning the leaf node n into the non-leaf node n linked to the two new leaf nodes by allocating each color in leaf node n to one of the two new leaf nodes and, B) a new total number of leaf nodes resulting from turning the leaf node n into the non-leaf node n linked to the two new leaf nodes;
   if the associated increased entropy rate is determined, then repeating (c) if the associated increased entropy rate is less than a target entropy rate; and
   if the new total number of leaf nodes is determined, then repeating (c) if the new total number of leaf nodes is less than a target number of leaf nodes.

24. The computer program product as defined in claim 18 wherein determining a representative color for a leaf node comprises
   for each color in the leaf node, determining a number of pixels in the associated subset of pixels having that color in the digitized color image; and,
   determining a centroid of all of the colors in the leaf node based on all of the colors in the leaf node and the number of pixels in the subset of pixels associated with each of the colors in the leaf node.

25. The computer program product as defined in claim 18 wherein (c)(ii) comprises allocating each color in leaf node n to one of the two new leaf nodes by determining, for each of the two new leaf nodes, an associated biased distortion measure involving both rate and distortion for allocating the color to that new leaf node, and allocating the color in leave node n to the new leaf node having a lower associated biased distortion measure.

26. The computer program product as defined in claim 25 wherein, for each of the two new leaf nodes, the associated biased distortion measure is determined by
   determining an associated change in distortion resulting from allocating the color to the new leaf node;
   determining an associated increase in entropy rate resulting from allocating the color to the new leaf node; and,
   calculating the associated biased distortion measure based on the associated change in distortion and the associated increase in entropy rate.

27. The computer program product as defined in claim 26 wherein, for each of the two new leaf nodes, determining an associated increase in entropy rate resulting from allocating that color to the new leaf node comprises,
   determining, for each pixel in the subset of pixels for that color, a set of neighboring pixels, wherein each pixel in the set of neighboring pixels borders the pixel;
   determining an entropy rate increase for the pixel based on the set of neighboring pixels; and
   determining an associated increase in entropy rate resulting from allocating that color to the new leaf node based on entropy rate increases of all pixels in the subset of pixels for that color.

28. The computer program product as defined in claim 18 wherein the acts further comprise initializing an image with fewer than M colors based on the at least one representative color for each starting node; and
   wherein (c)(iv) further comprises
      determining color updating information bits for a plurality of pixels of the digitized color image corresponding to the two representative colors of the two new leaf nodes according to allocation of colors in leaf node n to one of the two new leaf nodes in (c)(ii); and encoding the color updating information bits based on the image with fewer than M colors by using arithmetic coding.

29. The computer program product as defined in claim 18 wherein (c)(i) comprises,
for each leaf node, determining the associated achievable cost for turning the leaf node into a non-leaf node linked to two new leaf nodes; and,
selecting the leaf node based on comparing the associated achievable cost for that leaf node with the associated achievable cost for at least one other leaf node.

30. The computer program product as defined in claim 29 wherein (c)(i) comprises, for each leaf node, determining if the associated achievable cost for the selected leaf node is lower than the associated achievable cost for each of the other leaf nodes.

31. The computer program product as defined in claim 30 wherein (c)(i) comprises, for each leaf node, determining the associated achievable cost based on adding the associated change in distortion to a product obtained by multiplying the associated increase in the entropy rate by a multiplier.

32. The computer program product as defined in claim 31 where the multiplier is a fixed Lagrangian multiplier.

33. The computer program product as defined in claim 30 wherein (c)(i) comprises, for each leaf node, determining the associated achievable cost by
determining an associated achievable tradeoff between the associated increase in entropy rate and the associated reduction in distortion resulting from turning the leaf node into the non-leaf node linked to the two new leaf nodes; and,
determining the associated achievable cost based on the associated achievable tradeoff, the associated increase in entropy rate and the associated reduction in distortion.

34. The computer program product as defined in claim 18 wherein
the acts further comprise initializing an encoded image based on the at least one representative color for each starting node;
wherein (c) further comprises progressively updating the encoded image by appending the encoded bits obtained in (c)(iv).

35. A system for progressively encoding a digitized color image with M distinct colors allocated to a set of pixels, the digitized color image being provided by assigning each of the M distinct colors to an associated subset of pixels in the set of pixels, the system comprising a processor and a memory, the processor configured to:
(a) initialize a tree structure by providing at least one starting leaf node comprising a set of colors from the M distinct colors;
(b) determine at least one representative color for each starting leaf node; and
(c) grow the tree structure and update an encoded image by repeatedly
(i) selecting a leaf node n to become a non-leaf node n linked to two new leaf nodes based on an associated achievable cost, wherein the associated achievable cost is determined by
determining an associated change in distortion resulting from turning the leaf node into the non-leaf node linked to the two new leaf nodes;
determining an associated increase in entropy rate resulting from turning the leaf node into the non-leaf node linked to the two new leaf nodes; and,
determining the associated achievable cost based on the associated change in distortion and the associated increase in entropy rate;
(ii) creating the two new leaf nodes by allocating each color in leaf node n to one of the two new leaf nodes;
(iii) determining a representative color for each of the two new leaf nodes; and
(iv) encoding index information associated with the selected leaf node n, the representative colors of the two new leaf nodes, and color updating bits regarding a plurality of pixels of the digitized color image corresponding to the two representative colors of the two new leaf nodes.

36. The system as defined in claim 35 wherein (c)(i) comprises,
(A) for each leaf node in the tree structure, determining an achievable cost for that leaf node by tentatively splitting that leaf node by
(i) for each color allocated to that leaf node, tentatively allocating that color to one of two new tentative leaf nodes n' and n" based on:
determining a color quantization error resulting from representing that color with a tentative representative color determined for the one of two new tentative leaf nodes n' and n" to which that color is being tentatively allocated, and determining an increase in entropy per pixel resulting from representing each pixel in the subset of pixels having that color initially assigned thereto with the tentative representative color determined for the one of two new tentative leaf nodes n' and n" to which that color is being tentatively allocated,
wherein the determined increase in entropy per pixel is determined based on a context, in the encoded image as currently encoded, of each pixel in the subset of pixels having that color initially assigned thereto;
wherein the context for that pixel comprises a set of neighboring pixels in the encoded image as currently encoded;
(ii) determining a tentative change in distortion for that leaf node based on, for each color allocated to that leaf node, the color quantization error for that color and a tentative increase in entropy rate for that leaf node based on, for each color allocated to that leaf node, and for the context, in the encoded image as currently encoded, of each pixel in the subset of pixels having that color initially assigned thereto, an increase in entropy under that context; and
(iii) determining the achievable cost for that leaf node based on the tentative change in distortion for that leaf node and the tentative increase in entropy rate for that leaf node; and
(B) selecting a leaf node n to be split into two new leaf nodes n' and n" based on the achievable cost determined for each leaf node in the tree structure.

37. The system as defined in claim 36 wherein (A) further comprises, for each leaf node in the tree structure, iteratively repeating (A)(i), (A)(ii) and (A)(iii), and wherein, for each color, the determined increase in entropy per pixel is further based on, for each pixel in the subset of pixels having that color initially assigned thereto, a number of pixels tentatively allocated to tentative leaf node n' under the context for that pixel and a number of pixels tentatively allocated to tentative leaf node n" under the context for that pixel during an immediately prior iteration of (A)(i) for that leaf node.

38. The system as defined in claim 35 wherein the at least one starting leaf node is a root node of the tree structure and the set of colors in the root node includes all M distinct colors.

39. The system as defined in claim 35 wherein the at least one starting leaf node comprises a plurality of starting leaf nodes containing a plurality of disjoint subsets of the M distinct colors, wherein each disjoint subset of colors is included in one and only one starting leaf node in the plurality of starting nodes.

40. The system as defined in claim 35 wherein (c) further comprises determining at least one of A) an associated increased entropy rate resulting from turning the leaf node n into the non-leaf node n linked to the two new leaf nodes by allocating each color in leaf node n to one of the two new leaf nodes and, B) a new total number of leaf nodes resulting from turning the leaf node n into the non-leaf node n linked to the two new leaf nodes;

if the associated increased entropy rate is determined, then repeating (c) if the associated increased entropy rate is less than a target entropy rate; and if the new total number of leaf nodes is determined, then repeating (c) if the new total number of leaf nodes is less than a target number of leaf nodes.

41. The system as defined in claim 35 wherein determining a representative color for a leaf node comprises for each color in the leaf node, determining a number of pixels in the associated subset of pixels having that color in the digitized color image; and, determining a centroid of all of the colors in the leaf node based on all of the colors in the leaf node and the number of pixels in the subset of pixels associated with each of the colors in the leaf node.

42. The system as defined in claim 35 wherein (c)(ii) comprises allocating each color in leaf node n to one of the two new leaf nodes by determining, for each of the two new leaf nodes, an associated biased distortion measure involving both rate and distortion for allocating the color to that new leaf node, and allocating the color in leaf node n to the new leaf node having a lower associated biased distortion measure.

43. The system as defined in claim 42 wherein, for each of the two new leaf nodes, the associated biased distortion measure is determined by determining an associated change in distortion resulting from allocating the color to the new leaf node;

determining an associated increase in entropy rate resulting from allocating the color to the new leaf node; and, calculating the associated biased distortion measure based on the associated change in distortion and the associated increase in entropy rate.

44. The system as defined in claim 43 wherein, for each of the two new leaf nodes, determining an associated increase in entropy rate resulting from allocating that color to the new leaf node comprises, determining, for each pixel in the subset of pixels for that color, a set of neighboring pixels, wherein each pixel in the set of neighboring pixels borders the pixel;

determining an entropy rate increase for the pixel based on the set of neighboring pixels; and determining an associated increase in entropy rate resulting from allocating that color to the new leaf node based on entropy rate increases of all pixels in the subset of pixels for that color.

45. The system as defined in claim 35 wherein the processor is further configured to initialize an image with fewer than M colors based on the at least one representative color for each starting node; and, wherein (c)(iv) further comprises determining color updating information bits for a plurality of pixels of the digitized color image corresponding to the two representative colors of the two new leaf nodes according to allocation of colors in leaf node n to one of the two new leaf nodes in (c)(ii); and encoding the color updating information bits based on the image with fewer than M colors by using arithmetic coding.

46. The system as defined in claim 35 wherein (c)(i) comprises, for each leaf node, determining the associated achievable cost for turning the leaf node into a non-leaf node linked to two new leaf nodes; and, selecting the leaf node based on comparing the associated achievable cost for that leaf node with the associated achievable cost for at least one other leaf node.

47. The system as defined in claim 46 wherein (c)(i) comprises, for each leaf node, determining if the associated achievable cost for the selected leaf node is lower than the associated achievable cost for each of the other leaf nodes.

48. The system as defined in claim 47 wherein (c)(i) comprises, for each leaf node, determining the associated achievable cost based on adding the associated change in distortion to a product obtained by multiplying the associated increase in the entropy rate by a multiplier.

49. The system as defined in claim 48 where the multiplier is a fixed Lagrangian multiplier.

50. The system as defined in claim 47 wherein (c)(i) comprises, for each leaf node, determining the associated achievable cost by determining an associated achievable tradeoff between the associated increase in entropy rate and the associated reduction in distortion resulting from turning the leaf node into the non-leaf node linked to the two new leaf nodes; and, determining the associated achievable cost based on the associated achievable tradeoff, the associated increase in entropy rate and the associated reduction in distortion.

51. The system as defined in claim 35 wherein the system is a mobile wireless device.

52. The system as defined in claim 35 wherein the processor is further configured to initialize an encoded image based on the at least one representative color for each starting node; and wherein (c) further comprises progressively updating the encoded image by appending the encoded bits obtained in (c)(iv).

* * * * *